United States Patent [19]
Noguchi et al.

[11] 4,357,916
[45] Nov. 9, 1982

[54] TWO-STROKE CYCLE GASOLINE ENGINE

[75] Inventors: Masaaki Noguchi, Nagoya; Yukiyasu Tanaka; Isao Igarashi, both of Okazaki, all of Japan

[73] Assignee: Toyota Jidosha Kogyo Kabushiki Kaisha, Toyota, Japan

[21] Appl. No.: 187,793

[22] Filed: Sep. 16, 1980

Related U.S. Application Data

[63] Continuation of Ser. No. 960,657, Nov. 14, 1978, abandoned.

[30] Foreign Application Priority Data

Aug. 2, 1978 [JP] Japan ................................. 53-94238

[51] Int. Cl.³ ............................................ F02B 25/08
[52] U.S. Cl. ........................... 123/51 BA; 123/51 BD; 123/70 R; 123/73 A
[58] Field of Search .............. 123/51 R, 51 B, 51 BD, 123/51 BA, 69 R, 70 R, 65 A, 73 R, 73 A, 73 S, 73 AE, 73 AF, 73 CC, 73 CB

[56] References Cited

U.S. PATENT DOCUMENTS 2,347,444 4/1944 Vincent .............................. 123/70 R

FOREIGN PATENT DOCUMENTS 467513 6/1914 France ........................... 123/51 BD
330847 10/1935 Italy ................................ 123/51 BD

*Primary Examiner*—Craig R. Feinberg
*Attorney, Agent, or Firm*—Finnegan, Henderson, Farabow, Garrett & Dunner

[57] ABSTRACT

A two-stroke cycle gasoline engine including at least one two-stroke cycle power cylinder-piston assembly incorporating uniflow scavenging and two horizontally opposed pistons and two crankcases to perform crankcase compression, and at least one scavenging pump cylinder-piston assembly of the reciprocating type, wherein the power assembly has main and additional scavenging ports; the pump assembly has a first delivery port which supplies scavenging mixture to one of the crankcases of the power assembly and a second delivery port which supplies scavenging mixture directly to the additional scavenging port, the main scavenging port being supplied with scavenging mixture from the crankcases, wherein the top dead center of the pump assembly is, as viewed in the crank angle diagram, between the bottom dead center and the main scavenging port closing phase point of the power assembly, and wherein a means is provided so as to interrupt the supply of scavenging mixture from the first delivery port of the pump assembly to the one crankcase from a phase point located between the main scavenging port opening phase point and the bottom dead center of the power assembly to at least the top dead center of the pump cylinder-piston assembly.

10 Claims, 20 Drawing Figures

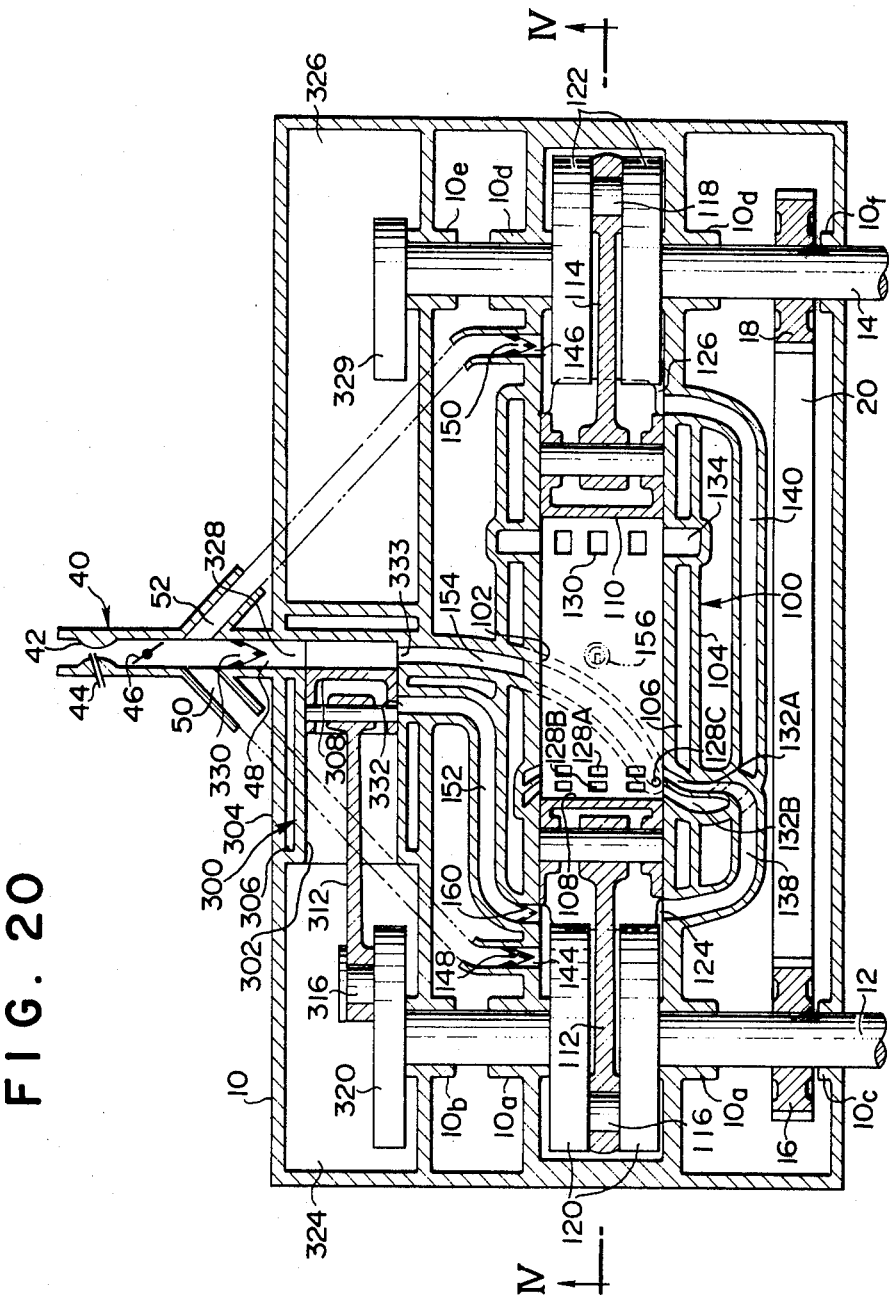

TWO-STROKE CYCLE GASOLINE ENGINE

This is a continuation of application Ser. No. 960,657, filed Nov. 14, 1978, now abandoned.

BACKGROUND OF THE INVENTION

The present invention relates to a two-stroke cycle gasoline engine, and, more particularly, to a two-stroke cycle gasoline engine adapted for use with automobiles.

A two-stroke cycle engine has theoretically the advantage that an engine of a certains size can generate a greater power than a four-stroke cycle engine of a bigger size because the two-stroke cycle engine has twice as many work cycles per revolution as the four-stroke cycle engine. In fact, however, the conventional two-stroke cycle gasoline engine employing a carburetor has such drawbacks that it has high fuel consumption as compared with the four-stroke cycle engine due to the loss of air-fuel mixture caused by the direct escape, i.e. blow-out, of scavenging mixture to an exhaust manifold during scavenging, and that it cannot generate such a high power as expected from the fact that it has twice as many work strokes as the corresponding four-stroke cycle engine, due to the fact that the scavenging is still insufficient. Because of these problems, the practical use of two-stroke cycle gasoline engines is nowadays limited to the field of small engines which must be simple in structure and low in manufacturing cost.

Conventional two-stroke cycle gasoline engines of the abovementioned type, therefore, generally employ crankcase compression for scavenging. However, the scavenging by crankcase compression is not fully effective and can only provide a relatively low volumetric efficiency. This is the principal cause of the poor output power of conventional two-stroke cycle gasoline engines. In fact, a volumetric efficiency as high as 80% is available in four-stroke cycle engines, while on the other hand the volumetric efficiency of typical two-stroke cycles engines is still as low as 40–50%. The pump stroke volume of crankcase compression is equal to the stroke volume of the engine. However, since the crankcase has a relatively large clearance volume, the compression ratio of crankcase compression is relatively low, so that as a result the amount of air-fuel mixture drawn to the crankcase is small, the amount of delivered mixture is small, the delivery pressure is low and hence the scavenging pressure is low, and consequently it is hard to supply a really adequate amount of scavenging mixture into the power cylinder. As a result, the delivery ratio obtained in an engine wherein scavenging is effected only by the normal crankcase compression is only as high as 0.5–0.8. Since further the trapping efficiency is about 0.7, the volumetric efficiency becomes as low as 40–50% as mentioned above.

The purpose of scavenging is to push the residual exhaust gases remaining in the power cylinder out of it by fresh mixture, and therefore if the pressure of the residual exhaust gases and the distance between the scavenging port and the exhaust port are given, the time required for completing scavenging is determined by the pressure and the amount of scavenging mixture, provided that stratified scavenging is performed. Now, if the scavenging pressure is low, as when crankcase compression is used, a relatively long time is required for completing scavenging, particularly when the scavenging is performed by uniflow scavenging. Therefore, when the engine is rotating at high speed, it may well occur that the exhaust port is closed before the scavenging is completed so that a large amount of exhaust gas still remains in the power cylinder, and thereby only a very small amount of fresh mixture is charged into the power cylinder. Therefore, conventional two-stroke cycle engines of uniflow scavenging type have been unable to operate satisfactorily in the high speed range.

Furthermore, when scavenging depends only upon crankcase compression, since a power piston also operates as a pump piston, as a matter of course, the operational phase difference between a power cylinder-piston assembly and a pump cylinder-piston assembly is exactly 180°. Therefore, the pump piston of a pump cylinder-piston assembly just reaches its top dead center (TDC) when the power piston of a power cylinder-piston assembly reaches its bottom dead center (BDC). In this connection, in the present description the top dead center (TDC) of a piston means the dead center of the piston at the end of the compression stroke of the piston, while the bottom dead center (BDC) of a piston means the dead center of the piston at the end of the suction or expansion stroke of the piston. In this case, however, although a half of the scavenging period still remaining to a power cylinder-piston assembly when its power piston has reached its BDC, a pump piston now begins to move toward its BDC, whereby the pressure in the crankcase lowers to generate a partial vacuum in the crankcase while the scavenging port still opens after the power piston goes far beyond its BDC, thereby causing the problem that the scavenging period is not all effectively utilized.

In view of the aforementioned problem with regard to scavenging by crankcase compression, and noting that that problem is the principal reason why the conventional two-stroke cycle engine using crankcase compression cannot be an actually effective engine, we have proposed, in U.S. Pat. No. 4,185,596, a two-stroke cycle gasoline engine which aims at as high operational performance as possible according to the principle of a two-stroke cycle gasoline engine by replacing scavenging dependent upon crankcase compression with scavenging dependent upon a separate scavenging pump, and by simultaneously constructing a power cylinder-piston assembly to incorporate uniflow scavenging and two horizontally opposed pistons and by constructing the separate scavenging pump to be of a reciprocating type having total stroke volume of 1.15–1.65 times as large as that of the power cylinder-piston assembly, and by further incorporating an operational phase relation between the power and the pump cylinder-piston assemblies so that the top dead center of the pump cylinder-piston assembly is, as viewed in the crank angle diagram, in a range between 15° in advance of and 15° behind the midpoint between the bottom dead center and the scavenging port closing phase point of the power cylinder-piston assembly to which the pump cylinder-piston assembly supplies scavenging mixture.

However, although it provides a particular advantage to abolish the crankcase compression completely, as is the case with the two-stroke cycle gasoline engine proposed in the aforementioned patent application, on the other hand, it requires the separate scavenging pump to have a relatively large stroke volume thereby causing the overall dimensions of the engine to increase when compared with a corresponding engine which utilizes crankcase compression.

Therefore, it is an object of the present invention to provide a two-stroke cycle gasoline engine which produces a substantially higher power output per unit volume of the engine displacement than a conventional two-stroke cycle gasoline engine by incorporating a supplementary scavenging pump in addition to effectively utilizing the crankcase compression, thereby substantially increasing both the amount and the pressure of scavenging mixture. In this case, the present invention contemplates to combine scavenging by the crankcase compression and scavenging by the supplementary scavenging pump in a particular manner related with the operational phase of the engine.

In more detail, in accordance with the present invention, the supplementary scavenging pump operates in its initial stage of operation as a booster which supplies its delivery mixture to a crankcase so as to increase both the amount and the pressure of scavenging mixture supplied by crankcase compression. Subsequently, at a predetermined phase point in a phase region located before BDC of a power piston, the supply of scavenging mixture from the supplementary scavenging pump to the crankcase is interrupted, and thereafter, during the remaining period of the scavenging period, the scavenging mixture from the supplementary scavenging pump is directly supplied to the power cylinder, thereby maintaining effective scavenging flow in the power cylinder over a substantial part of the scavenging period in which the scavenging ports are opened. For this purpose, the operational phase of the supplementary scavenging pump is somewhat delayed relative to that of the crankcase compression, that is, the piston of the supplementary scavenging pump reaches its TDC after the power piston has passed its BDC.

Known methods of scavenging in two-stroke cycle engines are conventionally cross scavenging, loop scavenging, and uniflow scavenging. In this connection, and in connection with the aforementioned high pressure scavenging contemplated in the present invention, if the scavenging pressure is increased in cross or in loop scavenging, the flow of scavenging mixture is liable to penetrate through exhaust gases existing in the power cylinder in a short-cutting manner, and also scavenging mixture and exhaust gases may be mixed with each other thereby not only causing poor scavenging, but also increasing the above explained blow-out loss of mixture, thus lowering the volumetric efficiency. On the other hand, it has been experimentally confirmed that, when uniflow scavenging is employed, it is possible to push uniformly the exhaust gases existing in the power cylinder out of it by the scavenging mixture at high pressure without causing any detrimental mixing between the scavenging mixture and the exhaust gases, and that, in this case, if the amount of scavenging mixture is increased so as to be necessary and sufficient, and if the duration of actual supply of scavenging mixture is long enough, scavenging at high scavenging efficiency is accomplished, and, as a result, the volumetric efficiency increases, resulting in corresponding increase of engine output power.

Therefore, it is another object of the present invention to provide a two-stroke cycle gasoline engine having a high volumetric efficiency in which high scavenging pressure and long-lasting supply of scavenging mixture effected by the aforementioned particular combination of crankcase compression and a supplementary scavenging pump are combinedly incorporated with uniflow scavenging.

By the aforementioned combination of high pressure and long-lasting supply of scavenging mixture with uniflow scavenging, the two-stroke cycle gasoline engine of the present invention is able to operate even in the relatively high speed operational range in which the conventional crankcase compression type two-stroke cycle gasoline engine is unable to operate with sufficient output power, and, therefore, it is possible to increase further the output power per unit volume of the space which the engine occupies. However, it is to be noted that the aforementioned relatively high speed rotational region is located in a lower speed region than the high rotational speed region of conventional automobile four-stroke cycle gasoline engines, and, therefore, it is still another object of the present invention to provide a two-stroke cycle gasoline engine which can generate sufficient output power in such a lower speed rotational region. Conventionally, a relatively small-sized four-stroke cycle gasoline engine for automobiles is designed so as to be operated at relatively high rotational speed so that relatively high power output is available from a relatively small-sized engine. In this connection, it is noted that, for example, in the case of an engine which has a two liter piston displacement and produces 92 PS of brake horsepower at 5000 rpm, a very large proportion of the power, such as 52 PS out of the indicated horsepower of 144 PS, is consumed by internal friction losses in the engine. The ratio of the internal friction loss to the output power of the engine is substantially reduced by lowering the rotational speed of the engine. The fact that a two-stroke cycle engine can generate higher power than a four-stroke cycle engine at lower rotational speed if its volumetric efficiency is increased is attributed to the feature that a two-stroke cycle engine has twice as many work cycles per revolution as a four-stroke cycle engine. The present invention contemplates effective utilization of this feature by increasing the volumetric efficiency of a power cylinder so that the rotational speed of the engine may be lowered to have a sufficient power output and so that the net output power per unit stroke volume of the engine may be increased. The maximum rotational speed of the engine contemplated in the present invention is 3800 rpm at the highest.

Furthermore, currently there exists a great demand for the development of cars which have low fuel consumption, in view of energy saving. Cars also must satisfy a high standard with regard to the prevention of air pollution. In order to improve fuel consumption, not only improvement of the fuel consumption of the engine itself, but also reduction of the air resistance of the vehicle are required. We noted, in connection with various running tests carried out to prepare for the qualification test for conforming to the standards for the prevention of air pollution (which are becoming more severe nowadays), that fuel consumption is different in summer and in winter due to the difference of atmospheric air density, and we more keenly recognized that the air resistance of the vehicle has an important effect on the fuel consumption of the vehicle even in low speed running.

In order to lower the air resistance of the vehicle it is important to reduce the height of the vehicle as much as possible and to form the vehicle in a streamlined external shape. Particularly, it is very effective to lower the engine hood. In order to reduce the height of the vehicle it is effective to eliminate the drive shaft for driving the rear wheels so that the shaft tunnel is eliminated and a flat floor is available over the entire floor area, thereby constructing a vehicle body having a low floor and a low roof. A method for accomplishing this is to employ the FF system, i.e. the front engine-front drive system. In order to lower the engine hood by a large amount in an automobile of FF type while ensuring necessary legroom for the driver and the front seat passenger, it is necessary to reduce substantially the height and length of the engine compartment. Furthermore, in order to reduce the air resistance of the vehicle, it goes without saying that the frontal area of the vehicle must be reduced. Therefore, the width of the vehicle should be minimized. Furthermore, since the transmission, differential gears, and other driving mechanisms must be housed in the engine compartment together with the engine, in the FF system, the space allowed for the engine is much reduced. Light trucks are often designed with the engine mounted under the driver's seat, and in such a design the engine, being relatively long, often extends so far backwards as to make a hump formed of the engine enclosure rearward of the cabin, thus shortening the deck.

It is, therefore, still another object of the present invention to provide a small-size gasoline engine having a low height, a small length and not a very large width, yet being capable of generating high power relative to the size of the engine. When this object is considered together with the other objects of the present invention which should be accomplished by a two-stroke cycle gasoline engine incorporating uniflow scavenging, it is contemplated that it is the most advantageous that the two-stroke cycle gasoline engine incorporating uniflow scavenging should employ two horizontally opposed pistons structure, as the power assembly, although other types of uniflow scavenging power assemblies, such as an assembly having a poppet valve in an exhaust port, are available.

Based upon the aforementioned basic structure, the present invention further proposes to determine the stroke volume of the supplementary scavenging pump to be 0.35–0.85 times as large as the total stroke volume of the power cylinder-piston assembly to which the pump cylinder-piston assembly supplies scavenging mixture. In this case, the total stroke volume of the power cylinder-piston assembly means the stroke volume displaced by the power piston when it moves from its BDC to its TDC. Therefore, the net compression stroke volume displaced by the power piston after it has closed the exhaust port until it reaches its TDC is smaller than the total stroke volume. When an engine includes more than one power cylinder or pump cylinder, the total stroke volume of the power cylinders or the pump should be the sum of the total stroke volume of applicable cylinders of the power cylinders or pump. In any event, in accordance with the present invention, it is proposed that the total stroke volume of the supplementary scavenging pump should be 0.35–0.85 times as large as the total stroke volume of the power cylinder to which the supplementary scavenging pumps supply scavenging mixture. The numerical limitation of 0.35–0.85 times as large has been determined in consideration of the amount and the pressure of scavenging mixture required for accomplishing high volumetric efficiency of supply of fresh mixture to a power cylinder such as 75%–100% or more in some cases.

In more detail, in order to increase volumetric efficiency of supply of fresh mixture to a power cylinder, the supply of scavenging mixture should be increased. However, excessive increase of the supply of scavenging mixture causes blow-out of scavenging mixture to the exhaust manifold during scavenging and increases fuel consumption and the density of hydrocarbons in the exhaust gases. The aforementioned numerical value of 0.85 is an upper limit determined in consideration of the fact that the engine of the present invention is a gasoline engine. On the other hand, the numerical value of 0.35 is a lower limit which may be used when the volumetric efficiency of the power cylinder needs to be only about 75%.

The time required for scavenging a power cylinder is determined by various factors such as the pressure difference between the pressure of scavenging mixture and that of the exhaust gases existing in the power cylinder when the scavenging port is opened, the length of the path along which scavenging mixture flows in the power cylinder while pushing exhaust gases until it reaches the exhaust port, i.e. the length of the helical path of scavenging mixture defined in the power cylinder in the case of the present invention which employs uniflow scavenging taking helical scavenging paths, and the behaviour of the initial and subsequent flow of scavenging mixture after the opening of the scavenging port, i.e. the initial pressure and the initial flow rate of scavenging mixture and subsequent changes of the pressure and the flow rate, and is not directly related with the rotational speed of the engine. However, the period which affects effectiveness of scavenging is the period between the opening and the closing of the scavenging port and since this period is shorter as the rotational speed of the engine is higher, it is necessary that the pressure and the amount of scavenging mixture should correspondingly increase as the rotational speed of the engine increases so that scavenging is completed before the scavenging port is closed. In this case, it is required that the introduction of scavenging mixture to the power cylinder should be maintained for a substantial time duration from the moment of opening of the scavenging port. Scavenging pressure available in the conventional crankcase compression is 0.3–0.35 atm (gauge pressure) at the highest due to a relatively large clearance volume involved therein. In the case of a particular modern design of crankcase it is possible to obtain scavenging pressure of about 0.45 atm. Even in this case, however, the scavenging pressure substantially lowers before the power piston reaches its BDC, and the amount of scavenging mixture is still insufficient.

In accordance with the present invention, when the engine is designed so as to accomplish sufficient scavenging in high speed operation of the engine, the scavenging pressure is increased to be above 0.4 atm and such a high scavenging pressure is maintained for a substantial time in the scavenging period.

A supplementary scavenging pump having total stroke volume 0.35–0.85 times as large as that of the power cylinder-piston assembly to which it supplies scavenging mixture should, in connection with the feature that the power cylinder-piston assembly is constructed so as to have horizontally opposed pistons, preferably be a pump cylinder-piston assembly having two horizontally opposed pistons. In this case, it is possible to harmonize the diameter of the pump cylinder and the stroke of the pump piston with those of the power cylinder-piston assembly, and it also provides the convenience with regard to the driving connection of the power cylinder-piston assembly and the pump cylinder-piston assembly that a pair of crankshafts arranged at opposite ends of the power cylinder-piston assembly need only to be extended so as also to serve as a pair of crankshafts of the pump cylinder-piston assembly.

In this connection, if a pair of crankshafts in the aforementioned driving structure are drivingly connected with each other with interposition of a rotational direction reversing means such as an idler gear, balancing of the rotational moment of the crankshafts and the power and pump pistons will be obtained. However, a rotational direction reversing means which includes an idler gear, etc. needs additional devices and will increase the manufacturing cost of the engine. Therefore, from cost-benefit evaluation the present invention contemplates, as an embodiment thereof, to connect a pair of crankshafts for the associated power and pump cylinder-piston assemblies each having two horizontally opposed pistons simply by an endless chain so that the two crankshafts are rotated in the same direction. However, it is a matter of balance between pursuit of silence and pursuit of low cost to select between co-rotation or counter-rotation of a pair of crankshafts, and it is a matter of design to be determined in view of design conditions of the engine.

Although it has been mentioned that the supplementary scavenging pump to be incorporated in a two-stroke cycle gasoline engine of the present invention should preferably be a pump cylinder-piston assembly having two horizontally opposed pistons, of course, the supplementary scavenging pump may be a pump cylinder-piston assembly having a single pump piston. When a single piston type pump cylinder-piston assembly is employed, there is the disadvantage on the one hand that relative dimensions and harmony between the power cylinder-piston assembly and the pump cylinder-piston assembly and dynamic balance of the pump cylinder-piston assembly are less desirable than when a pump cylinder-piston assembly having two horizontally opposed pistons is used, while on the other hand there is the advantage that the manufacturing cost is reduced. Particularly for small sized engines, the advantage of reduction of manufacturing cost may well get the better of the abovementioned structural disadvantage.

As mentioned above, one of the basic constitutions of the present invention is the combination of a supplementary scavenging pump with the conventional crankcase compression so as to maintain high pressure and flow of scavenging mixture for a relatively long time after the scavenging port has been opened, thereby accomplishing high volumetric efficiency of the power cylinder. For this purpose, in accordance with the present invention, it is proposed that the top dead center of the supplementary scavenging pump of the reciprocating type should be delayed relative to the bottom dead center of the power cylinder-piston assembly, or, in other words, to delay the bottom dead center of the supplementary scavenging pump relative to the top dead center of the power cylinder-piston assembly, i.e., the bottom dead center of the crankcase compression.

However, if this delay in phase is excessive, the delivery pressure of the supplementary scavenging pump at the time point when the scavenging port is opened will become insufficient, and, therefore, the pressure in the crankcase will not be increased up to the level which is required for accomplishing the effect intended by the present invention. Particularly when it is intended to increase volumetric efficiency of an engine in its high speed operation, high scavenging pressure is demanded at the time point when the scavenging port is opened. In this case, therefore, it is required that the supplementary scavenging pump should have covered a substantial phase angle from its bottom dead center before the scavenging port is opened. In consideration of this factor, the BDC of the supplementary scavenging pump is determined, as shown in FIG. 1, to be, as viewed in the crank angle diagram, in a range between 15° in advance of and 15° behind the point which is 90° in advance of the scavenging port opening phase point (So) of the power cylinder-piston assembly to which the supplementary scavenging pump supplies scavenging mixture. By positioning BDC of the supplementary scavenging pump in such a phase range and by conducting the delivery mixture of the pump into the crankcase, the pressure in the crankcase is properly increased so that the scavenging pressure in the initial stage of scavenging period is desirably increased by co-operation of the crankcase compression and the supplementary scavenging pump to such an extent as effectively to accomplish the purposes of the present invention. In this case, the scavenging pressure at the scavenging port opening phase point (So) is determined by various factors such as: clearance volume of the crankcase; stroke volume of the supplementary scavenging pump; crank angle between BDC of the supplementary scavenging pump and the scavenging port opening phase point So; whether the delivery mixture of the supplementary scavenging pump is supplied to both crankcases of a power cylinder-piston assembly having two horizontally opposed pistons or to only one of the two crankcases; when the scavenging mixture is supplied to only one crankcase, whether or not the scavenging mixture from said one crankcase interferes with the scavenging mixture from the other crankcase so as to reduce its pressure; etc..

However, even when the pressure and the flow of scavenging mixture delivered from the crankcase are increased by introducing scavenging mixture delivered from the supplementary scavenging pump to the crankcase, when the power piston approaches its BDC, the pressure in the crankcase abruptly lowers because the movement of the power piston is substantially slowed down as it approaches its BDC, thereby reducing the effect of crankcase compression, and furthermore the crankcase enters into its suction stroke after the power piston has passed its BDC. In view of this, the present invention contemplates to interrupt the supply of scavenging mixture from the supplementary scavenging pump to the crankcase before the power piston reaches its BDC, and to supply thereafter the scavenging mixture delivered from the supplementary scavenging pump directly to the power cylinder. By this arrangement, the supply of scavenging mixture to the power cylinder is effectively maintained even in the latter half of the scavenging period, i.e. after BDC of the power piston, and it is avoided that the scavenging mixture delivered from the supplementary scavenging pump should be uselessly supplied to the crankcase which is performing its suction stroke. In this case, the closer the BDC of the supplementary scavenging pump is approached to the scavenging port opening phase point So, or the earlier the supply of scavenging mixture from the supplementary scavenging pump to the crankcase is interrupted, the more scavenging mixture remains in the supplementary scavenging pump at the time of interruption, so that a larger amount of scavenging mixture is directly supplied from the supplementary scavenging pump to the power cylinder after the interruption of the supply of scavenging mixture from the supplementary scavenging pump to the crankcase. In accordance with the present invention, the time point of the interruption, i.e. the time point when the passage which conducts scavenging mixture from the supplementary scavenging pump to the crankcase is interrupted, is determined, as viewed in the crank angle diagram, to be in a range 10°–30° before BDC of the power piston. In this connection, in the present specification the opening phase point with regard to the scavenging or exhaust port respectively means the phase point at which the scavenging or exhaust port begins to open, and the closing phase point with regard to the scavenging or exhaust port respectively means the time point at which the scavenging or exhaust port begins to close, in the unsual manner of using these terms.

In connection with the aforementioned feature of the present invention that the supply of scavenging mixture from the supplementary scavenging pump to the crankcase is interrupted part way through the scavenging period and thereafter the scavenging mixture delivered from the supplementary scavenging pump is directly supplied to the power cylinder, the present invention contemplates, as another additional feature, to provide the passage for directly supplying scavenging mixture from the supplementary scavenging pump to the power cylinder to be substantially throttled at its discharge end towards the inside of the power cylinder. Nowadays it is practiced to increase the air/fuel ratio of the mixture supplied to a gasoline engine, i.e. to employ lean mixture, in order to reduce the amount of harmful components in exhaust gases. Such lean combustion is particularly employed in partial load operation of the engine. In partial load operation the throttle valve is partly closed, and as a matter of course the delivery ratio of scavenging mixture is low, thereby causing an increased amount of exhaust gases to remain in the power cylinder. Therefore, in partial load operation incorporating lean combustion, the ignitability of the fuel-air mixture lowers greatly, and the burning velocity of the fuel-air mixture also greatly lowers. In accordance with the present invention, these problems are effectively obviated by the scavenging mixture directly supplied from the supplementary scavenging pump to the power cylinder from part way through the scavenging period being ejected as a jet into the power cylinder due to the aforementioned throttling of the passage which conducts scavenging mixture directly from the supplementary scavenging pump to the power cylinder in its discharge end opened toward the inside of the power cylinder, whereby the jet generates turbulences in the power cylinder which effectively improve the ignitability and burning velocity of the fuel-air mixture. Since in this case such turbulences of scavenging mixture are generated principally in the latter half portion of the scavenging period, disadvantages such as causing of mixing between scavenging mixture and exhaust gases in the power cylinder or such as causing direct blow-out of scavenging mixture to the exhaust manifold during scavenging, which would occur if such turbulences were generated in an early stage of scavenging, are not suffered. Furthermore, since the turbulences of scavenging mixture due to the aforementioned jet injection of mixture are generated after BDC of the power piston, the turbulences are maintained during the compression stroke of the power cylinder.

When a gasoline engine of the present invention includes, for example, two power cylinder-piston assemblies each having two horizontally opposed pistons, the supplementary scavenging pump may be of either of the following two types. In one type, with the two power cylinder-piston assemblies being operated in exactly the same phase, the supplementary scavenging pump is a single acting piston pump having total stroke volume twice as large as that required for one power cylinder-piston assembly. In this case, if the stroke volume which the supplementary scavenging pump should have for one power cylinder-piston assembly is relatively small so that a one-piston single acting pump is able to have the required stroke volume, it is desirable that the supplementary scavenging pump should be a pump cylinder-piston assembly having two horizontally opposed pistons so that it provides a double stroke volume required to serve for two power cylinder-piston assemblies. On the other hand, if the power cylinder-piston assembly is relatively large so that one pump cylinder-piston assembly having two horizontally opposed pistons is required for one power cylinder-piston assembly, it is desirable that the pump cylinder-piston assembly should be modified without changing the stroke of the pump pistons to have an increased diameter of pump cylinder to be approximately the square root of two times as large. In the other type, with the two power cylinder-piston assemblies being operated with a phase difference of 180° from each other, the supplementary scavenging pump is of a double acting type. In this case, torque fluctuation of power output shaft becomes small.

SUMMARY OF THE INVENTION

In view of the various problems with regard to the conventional art and of the various objects and features of the present invention discussed above, in summary the present invention proposes a two-stroke cycle gasoline engine comprising at least one two-stroke cycle power cylinder-piston assembly having two horizontally opposed pistons, two crankcases to perform crankcase compression, main scavenging ports supplied with scavenging mixture from said crankcases, and at least one additional scavenging port located in or adjacent to one of said main scavenging ports and incorporating uniflow scavenging, a supplementary scavenging pump including at least one pump cylinder-piston assembly of the reciprocating type having at least one pumping chamber and driven by said power cylinder-piston assembly in synchronization therewith, a first passage which connects one pumping chamber of one pump cylinder-piston assembly of said supplementary scavenging pump to at least one crankcase of one power cylinder-piston assembly which is supplied with scavenging mixture by said one pumping chamber via said one crankcase, a second passage which connects said one pumping chamber to the additional scavenging port of said one power cylinder-piston assembly to supply scavenging mixture, the top dead center of said one pumping chamber being, as viewed in the crank angle diagram, between the bottom dead center and the main scavenging port closing phase point of said one power cylinder-piston assembly, and a closer to close said first passage from one phase point located between the main scavenging port opening phase point and the bottom dead center of said one power cylinder-piston assembly to at least the top dead center of said one pumping chamber.

BRIEF DESCRIPTION OF THE DRAWINGS

The present invention will become more fully understood from the detailed description given hereinbelow and the accompanying drawings, which are given by way of illustration only, and therefore are not limitative of the present invention, and wherein:

FIG. 20 is a diagrammatical plan sectional view, similar to FIG. 3, showing a sixth embodiment of the two-stroke cycle gasoline engine of the present invention.

DESCRIPTION OF THE PREFERRED EMBODIMENT

Figure 1:
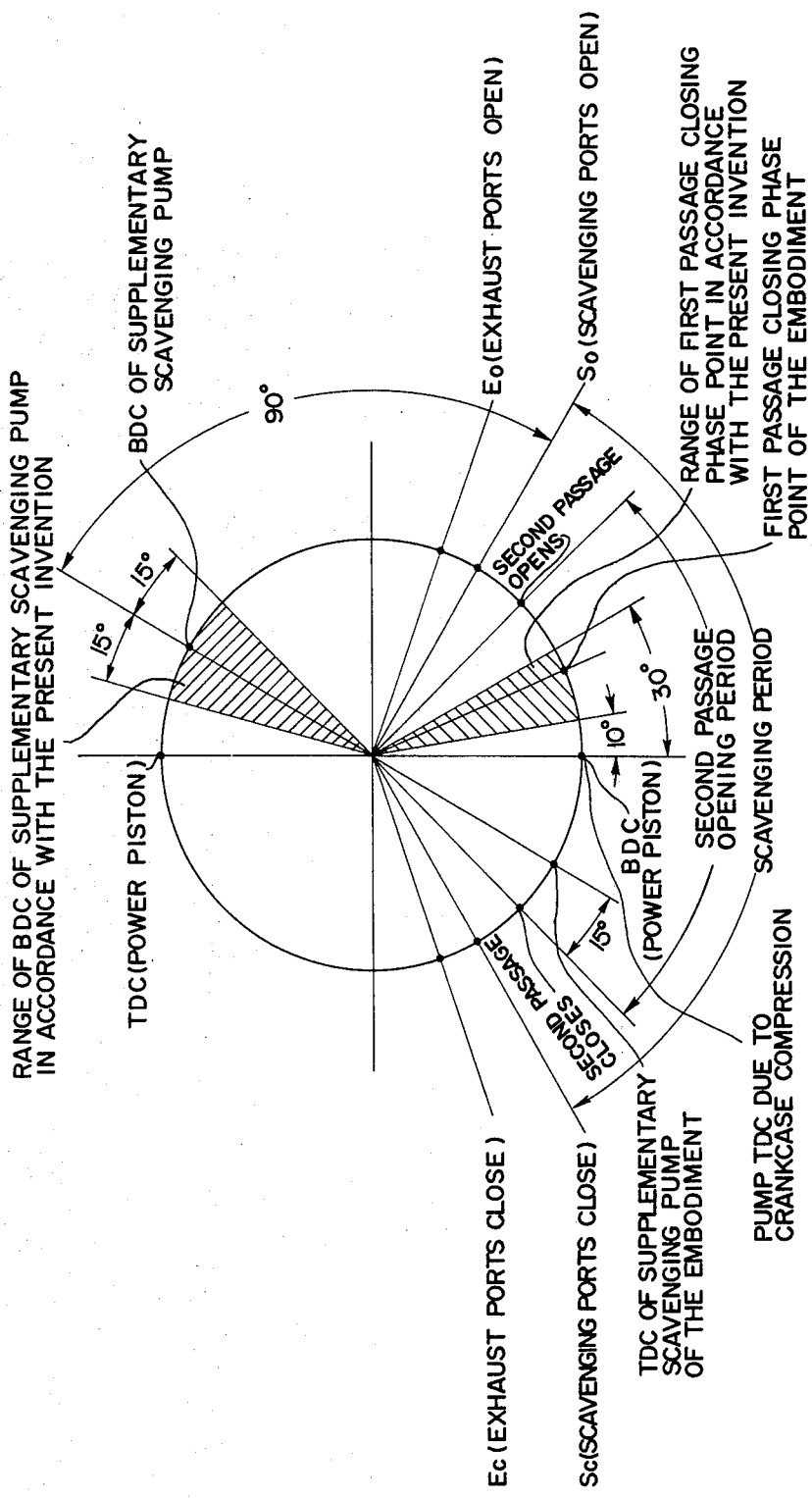
FIG. 1 is a crank angle diagram showing operational phases of a two-stroke cycle gasoline engine of the present invention.

Referring first to FIGS. 3-6, showing the first embodiment of the present invention, the two-stroke cycle gasoline engine herein shown comprises a cylinder block 10, the overall shape of which is like a relatively flat block rectangular in a plan view and adapted to be installed with its two largest faces arranged horizontally. In the cylinder block there are provided a pair of crankshafts 12 and 14 which are arranged along the opposite edges of the cylinder block and are rotatably supported by bearings 10a-10c and 10d-10f, respectively. In this embodiment, for example, the crankshaft 12 may be connected to auxiliaries for the engine, while the crankshaft 14 may serve as the power output shaft of the engine. In the cylinder block 10 there are incorporated a power cylinder-piston assembly 100 and a supplementary scavenging pump means 300, which is in this embodiment an independent pump cylinder-piston assembly having two horizontally opposed pistons.

First, the power cylinder-piston assembly will be described. The assembly includes a power cylinder 102 supported by the cylinder block 10. The power cylinder is surrounded by a cooling jacket 106 defined by a jacket wall 104. In the cylinder 102 are arranged two power pistons 108 and 110, one being located on the scavenging port side or the left side in the figure while the other is located on the exhaust port side or the right side in the figure. The pistons 108 and 110 are respectively connected with connecting rods 112 and 114, which in turn are respectively connected with crankpins 116 and 118. The crankpins 116 and 118 are individually supported by crank arms 120 and 122, each of which has a disk shape. The two crank mechanisms each including the disk-shaped crank arms and the crankpin are individually housed in crankcases 124 and 126 having a corresponding internal shape so that regardless of rotational angle of the crank the principal internal space of each crankcase is occupied by the crank so as to reduce the clearance volume of the crankcase to the minimum value.

Figure 5:
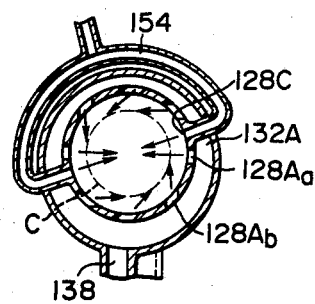
FIGS. 5 and 6 are sectional views along lines V—V and VI—VI in FIG. 4, respectively.
Figure 6:
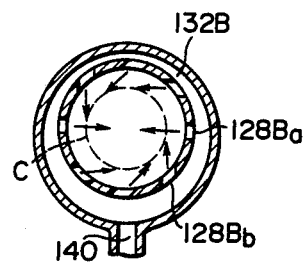

The cylinder 102 has a plurality of scavenging ports 128 in its scavenging port side and a plurality of exhaust ports 130 in its exhaust port side. The scavenging ports 128 include a first group of scavenging ports 128A and a second group of scavenging ports 128B, which are adjacent to each other in the axial direction of the power cylinder. Further, as shown in FIG. 5, the scavenging ports 128A include two opposed scavenging ports 128Aa which open towards the central axis of the power cylinder 102, and six scavenging ports 128Ab which open along axes tangential to a phantom cylinder C contained in and coaxial with the cylinder 102. Similarly, as shown in FIG. 6, the scavenging ports 128B include two opposed scavenging ports 128Ba which open toward the central axis of the cylinder 102, and six scavenging ports 128Bb which open along axes tangential to a phantom cylinder C' contained in and coaxial with the cylinder 102. Furthermore, all these scavenging ports are inclined towards the exhaust port side of the cylinder so that the flows of scavenging mixture discharged from these scavenging ports have a velocity component towards the exhaust ports 130. The first and second groups of scavenging ports 128A and 128B are connected with first and second scavenging plenums 132A and 132B, which are closely arranged to one another, respectively. On the other hand, the exhaust ports 130 are connected to exhaust plenum 134, which is connected with exhaust pipes 136. The scavenging plenum 132A is connected with the crankcase 124 by a passage 138, while on the other hand the scavenging plenum 132B is connected with the crankcase 126 by a passage 140.

Next, the pump 300 will be described. The pump includes a pump cylinder 302 supported by the cylinder block 10. The pump cylinder 302 is surrounded by a cooling jacket 306 defined by a jacket wall 304. This cooling jacket serves to remove the compression heat of mixture generated in the pump 300 so as to increase the volumetric efficiency of the pump, while further, when the engine is operated in cold weather, it serves to warm the pump cylinder so as to expedite atomization of the gasoline. For these purposes, the cooling jacket 306 is connected with the cooling jacket 106 of the power cylinder by a passage means not shown in the figure. In the pump cylinder 302 are provided a pair of pump pistons 308 and 310 as opposed to one another. The pistons 308 and 310 are individually connected with connecting rods 312 and 314, which in turn are individually connected with crankpins 316 and 318. The crankpins 316 and 318 are individually supported by crank arms 320 and 322 which, in the shown embodiment, are individually formed as cantilever type crank arms for the purpose of reducing the weight of the engine. The crank mechanisms composed of the connecting rods, crank pins, and crank arms are individually housed in crankcases 324 and 326 which are connected with the internal space of an air cleaner (not shown in the figure) by positive crankcase ventilation valves (also not shown in the figure). The crankshafts 12 and 14 are drivingly connected with each other by way of sprocket wheels 16 and 18 individually mounted on said two crankshafts and an endless chain 20 engaged around the sprocket wheels so that the crankshafts rotate in the same rotational direction at the same rotational speed. The phase relation between the two crankshafts is so determined that the crankpins 116 and 118 individually related to the power pistons 108 and 110 are shifted from each other by 180°. Depending upon such a phase relation between the crankshafts 12 and 14, the phase relation between the crankpins 316 and 318 individually related to the pump pistons 308 and 310 is so determined that the crankpins are shifted from each other by 180°.

40 designates a carburetor which includes a venturi portion 42, a main fuel nozzle 44 which opens to the throat portion of the venturi portion, and a throttle valve 46, and takes in air from its air inlet port located upward in the figure and produces fuel-air mixture in the usual manner. The mixture outlet port of the carburetor 40 is connected with an inlet port 328 of the pump 300 by way of a passage 48 and is also connected with inlet ports 144 and 146 of the crankcases 124 and 126 by way of passages 50 and 52, respectively. In the port 328 is provided a reed valve 330 which allows fluid to flow only towards the pump chamber. Similarly, in ports 144 and 146 are provided reed valves 148 and 150, respectively, each allowing fluid to flow only towards its crankcase. The pump 300 has a first outlet port 332 which is shifted from the axial midpoint of the pump cylinder 302 so as to be closed by one of the two pump pistons, i.e. the pump piston 308 in the shown embodiment, before the pump 300 reaches its TDC, and a second outlet port 333 located at the axial midpoint of the pump cylinder 302. The first outlet port 332 is connected with the crankcase 124 by way of a passage 152. The second outlet port 333 is, by way of a passage 154, connected with a third group of scavenging ports which open in the power cylinder 102 in the vicinity of the scavenging ports 128A and 128B, said third group of scavenging ports being, in the shown embodiment, two opposed scavenging ports 128C. As better shown in FIG. 5, the scavenging ports 128C open towards the central axis of the power cylinder 102, and are also inclined toward the exhaust side of the cylinder so that the flows of scavenging mixture discharged from these scavenging ports also have a velocity component toward the exhaust ports 130. At a middle portion of the passage 152 is provided, adjacent to the crankcase 124, a reed valve 160 in order to prevent reversed flow therethrough.

Figure 3:
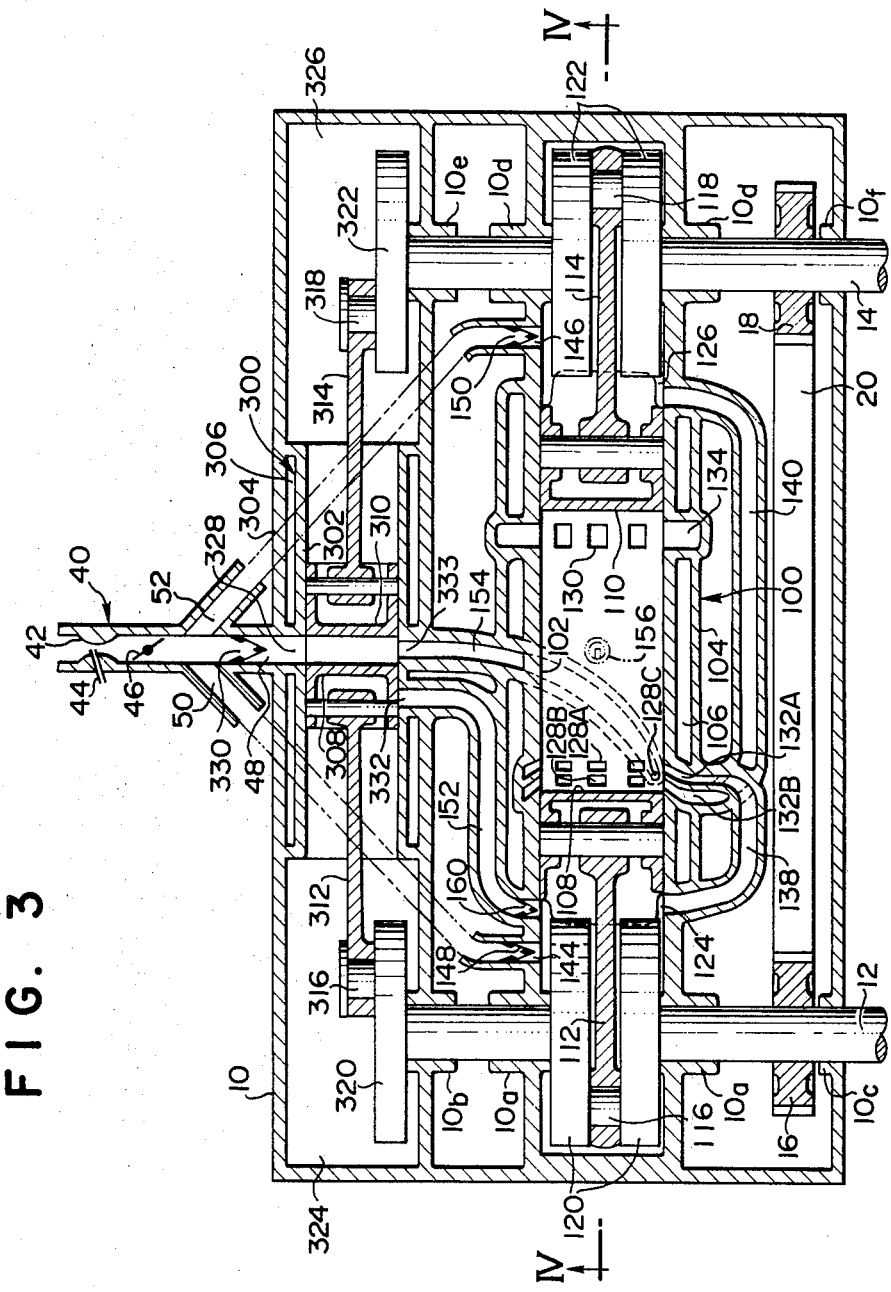
FIG. 3 is a diagrammatical plan sectional view showing a first embodiment of the two-stroke cycle gasoline engine of the present invention.
Figure 4:
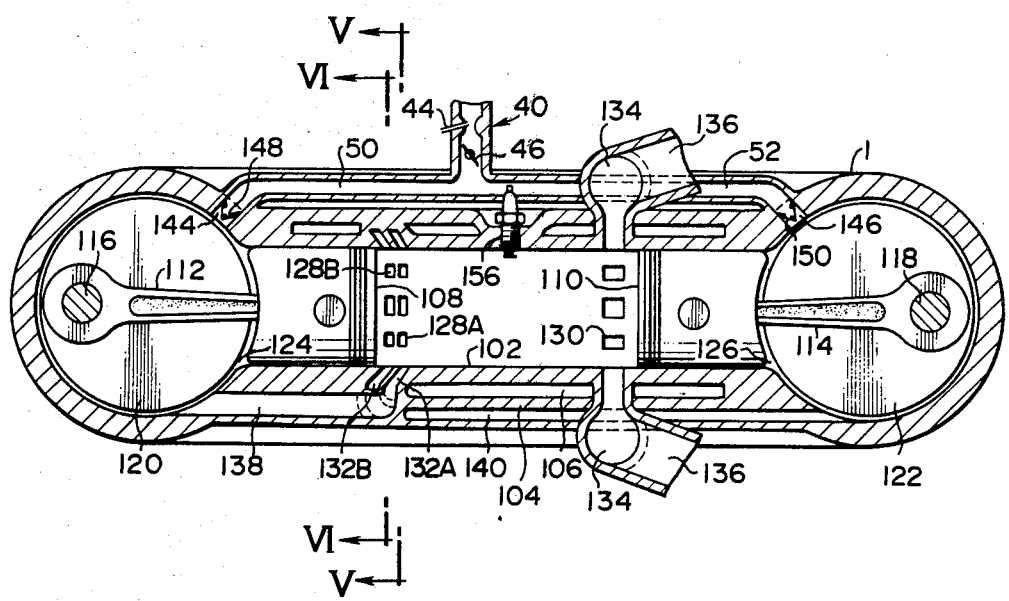
FIG. 4 is a sectional view along line IV—IV in FIG. 3.

Although in FIG. 3 the carburetor 40, passages 50 and 52, ports 144 and 146, and passages 152, 154, 138 and 140 are shown as developed in a plan view for the convenience of illustration, in the actual engine it is desirable that these means or structures should be three-dimensionally constructed in the following manner. With respect to the passages 138 and 140, it is desirable that these passages should open individually between a pair of crank arms 120 and 122 so that the flow of mixture introduced into the crankcase is not obstructed by the crank arm 120 or 122 or the piston 108 or 110. When the engine is in the cold state, liquid fuel accumulates in the bottom of the crankcase. Therefore, it is desirable that the passages 138 and 140 should open to the bottoms of the crankcases so that they can readily take out the accumulated fuel. It is also desirable that the ports 144 and 146 should open between the pair of crank arms 120 and 122 so that the flow of mixture is not obstructed by the arms 120 and 122. When the engine is in the cold state, the carburetor 40 provides poor atomization of fuel, and fuel droplets will be discharged into the passages 48, 50, and 52. Therefore, it is desirable that the carburetor should be located above the pump or the crankcases of the power cylinder-piston assembly so that such fuel droplets can flow into the pump chamber or the crankcases by the action of gravity. Such an arrangement is shown in FIG. 4. Furthermore, as seen in FIG. 3, it is desirable that the power assembly 100 and the pump assembly 300 should be arranged as close to one another as possible. In this connection, therefore, it is desirable that the passages 152 and 154 should be arranged through the clearance left between the power assembly 100 and the pump assembly 300. The ports through which the passages 152 and 154 open individually to the crankcases 124 and 126 may be located so as to oppose the crank arms 120, 122, or the pistons 108, 110, if the ports are adapted so as not to be strongly throttled, because the mixture supplied through the passages 152 and 154 is pressurized by the pump.

An ignition plug 156 is provided at a longitudinally central portion of the power cylinder 102.

Figure 2:
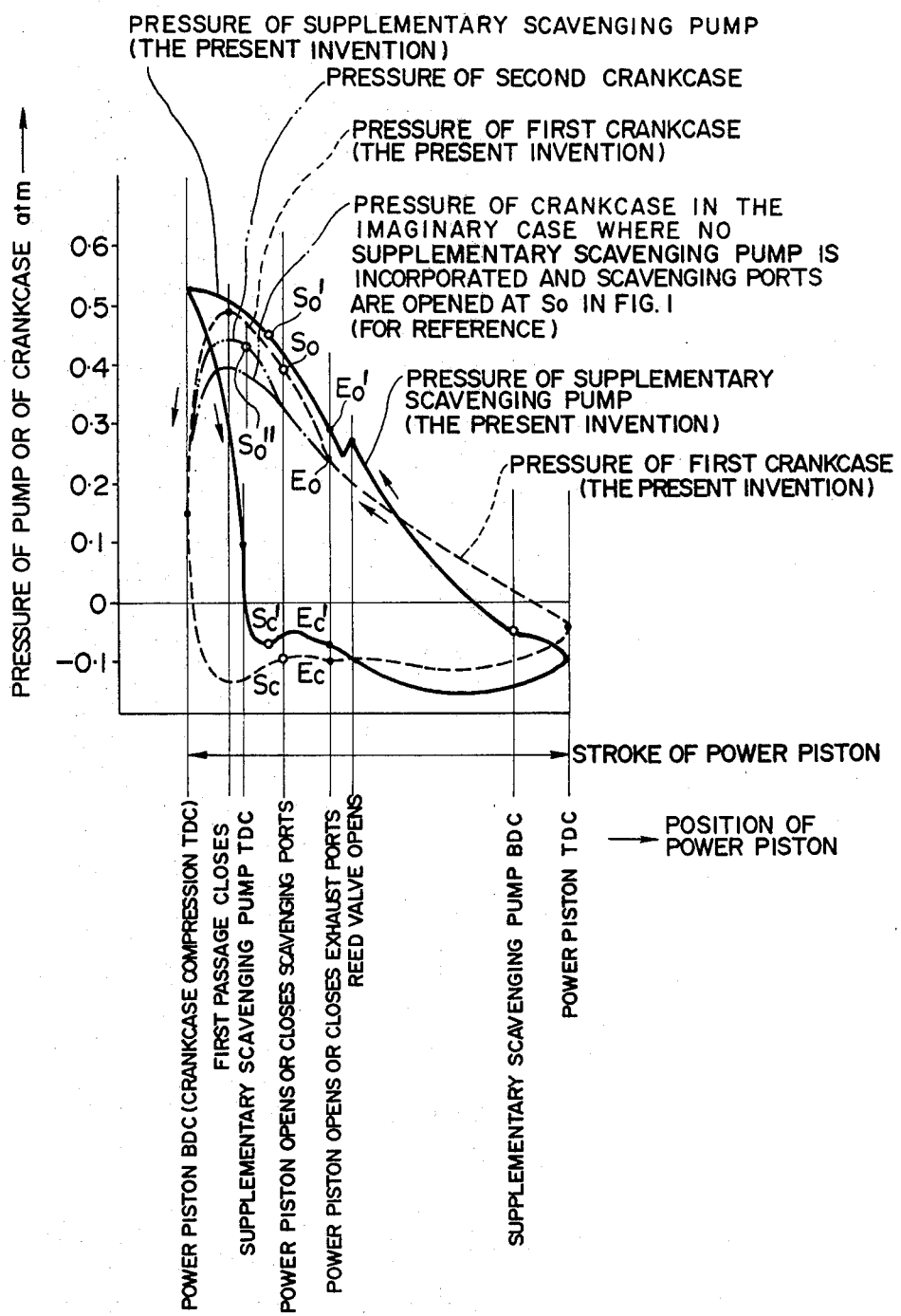
FIG. 2 is an indicator diagram showing the pressures of the supplementary scavenging pump and the crankcase compression relative to the position of the power piston in a two-stroke cycle gasoline engine of the present invention, wherein the crankcase pressure in a similar engine incorporating conventional crankcase compression is also shown for the purposes of comparison.

In this embodiment the bottom dead center of the pump 300, i.e. the supplementary scavenging pump, is positioned 90° in advance of the scavenging opening port phase point So, which in turn is 60° in advance of the bottom dead center of the power piston. Therefore, the bottom dead center of the pump 300 is 30° behind the top dead center of the power piston. When the pump pistons 308 and 310 move from their BDC to their TDC, the mixture existing in the pump cylinder 302 is discharged towards the first and second passages 152 and 154. As seen in FIG. 2, when the supplementary scavenging pump 300 is in a condition close to its BDC, the pressure in the crankcase is higher than that of the pump 300. When the crank further rotates so far that the pump pressure becomes higher than the crankcase pressure and the pressure difference therebetween once overcomes the resistance of the reed valve 160, the mixture from the pump pushes the reed valve 160 open and flows into the first crankcase 124. At this moment, as seen in FIG. 2, the pressure of the supplementary scavenging pump temporarily slightly lowers. Thereafter, the pressure in the first crankcase 124 increases due to the supply of scavenging mixture by the pump 300. In this case, as seen in FIG. 2, the pump pressure is slightly higher than the pressure in the first crankcase in order to maintain the reed valve 160 in its open condition.

As seen in FIG. 2, at a time when the pressure in the first crankcase 124 begins to increase steeply due to the supply of mixture from the supplementary scavenging pump 300, the power piston 110 reaches the exhaust port opening phase point Eo, and begins to open the exhaust ports 130, and thereby exhausting of exhaust gases from the power cylinder is initiated. When the crankshaft has further somewhat rotated, the power piston 108 reaches the scavenging port opening phase point So, and the scavenging ports are gradually opened from the side of the ports 128A. As seen in FIG. 3, since the third scavenging ports 128C are shifted toward the side of the crankcase 124 relative to the first scavenging ports 128A, the scavenging ports 128C are opened at a phase point which is somewhat behind the scavenging port opening phase point So, as seen in FIG. 1. As seen in FIG. 1, the first outlet port 332 of the supplementary scavenging pump 300 is closed by the pump piston 308 at a point located in a phase region between 10° and 30° in advance of the bottom dead center of the power piston. In this connection, the first passage closing phase point in FIG. 1 is the phase point at which the outlet port 332 is completely closed by the pump piston 308 so that the supply of mixture through the passage 152 is completely stopped. After the outlet port 332 has been closed, the pressure in the first crankcase begins to lower, and in the vicinity of the bottom dead center of the power piston the crankcase pressure abruptly lowers. After the first outlet port 332 has been closed, the supply of mixture from the pump cylinder 302 to the third scavenging ports 128C through the central second outlet port 333 and the second passage 154 is continued. In this connection, as better shown in FIG. 5, the third scavenging ports 128C are each formed to provide a throttled nozzle opening so that mixture is delivered from these ports into the power cylinder as jets. In this case, as seen in FIG. 5, the jets of scavenging mixture delivered from the two opposing scavenging ports 128C collide with each other on the central axis of the power cylinder, and form a turbulent flow. The jets also produce turbulent flows by shearing action made when they penetrate through the slower speed ambient flow of scavenging mixture. However, when such a collision of the jets undesirably reduces the velocity of the jets so as to impede the generation of turbulent flow, as in the case, for example, where the velocity of the jets is low, and the two jet flows strictly oppose one another along a line, it is desirable that the two scavenging ports 128C should be shifted relative to one another so as to form a swirling flow which promotes the swirling flow generated by the scavenging mixture delivered from the first scavenging ports 128A and produces the turbulent flow by the shearing action. In this case, in order to avoid such a problem so that the jets ejected from the scavenging ports 128C directly impinge on the scavenging ports 128A located opposite to the scavenging ports 128C and flow out of the power cylinder reversely through the scavenging ports 128A, it is desirable that the scavenging ports 128C should be sufficiently inclined towards the exhaust side of the power cylinder. Since the third scavenging ports 128C are to some extent shifted towards the side of crankcase 124 relative to the first scavenging ports 128A, the phase point at which the third scavenging ports 128C are opened, i.e. the second passage 154 is opened, is to some extent delayed from the scavenging port opening phase point So at which the first scavenging ports 128A are opened. In this case, the angle of delay of the second passage opening phase point relative to the scavenging port opening phase point should preferably be so determined that the phase point at which the scavenging ports 128C are closed, i.e. the phase point at which the second passage is closed, which is symmetrical to said second passage opening phase point with respect to the line connecting the top dead center and the bottom dead center of the power piston in FIG. 1, is about 15° behind the top dead center of the supplementary scavenging pump. This takes the fact into consideration that, since there is a time delay for the scavenging mixture to flow from the outlet port 333 of the pump 300 to the scavenging ports 128C, the flow of scavenging mixture toward the scavenging ports 128C is maintained for some time after the pump 300 has reached its top dead center. If the phase point at which the scavenging ports 128C is opened, i.e. the second passage opening phase point, is too close to the scavenging port opening phase point So, the boundary layer between the exhaust gases and scavenging mixture in the power cylinder 102 will be disturbed by the jet flow of scavenging mixture ejected from the scavenging ports 128C, thereby causing the direct blow-out of scavenging mixture to the exhaust manifold. Therefore, it is desirable that the second passage opening phase point should be delayed relative to the scavenging port opening phase point So by an angle such as shown in FIG. 1. In this case the pump pressure at the second passage opening and closing phase points are of values such as designated by So' and Sc', respectively, in FIG. 2. When the phase delay of the bottom dead center of the pump relative to the top dead center of the power piston is large, the crankcase pressure becomes higher than the pump pressure in a relatively wide phase range. Therefore, the reed valve 160 is required, as provided in the embodiment shown in FIG. 3, in order to prevent fluid from flowing inversely through the first passage 152. However, as seen in FIG. 1, if the phase difference between the top dead center of the power piston and the bottom dead center of the supplementary scavenging pump is a minimum, such as about 15°, the aforementioned inverse flow of scavenging mixture may be practically negligible. In such a case the reed valve 160 may be omitted. In this case the third scavenging ports 128C may be provided to open within some of the first scavenging ports 128A. In this case, however, it must be noted that the scavenging ports 128C should open so as not to direct the jet flows of mixture therethrough toward the opposing scavenging ports 128A, by inclining the axes of the scavenging ports 128C sufficiently toward the exhaust side of the cylinder. When the phase difference between the top dead center of the power piston and the bottom dead center of the supplementary scavenging pump is substantially greater than 15°, so that the reed valve 160 is required in the first passage in order to prevent inverse flow of mixture therethrough, it is also required that inverse flow of mixture from the crankcase 124 to the second passage 154 through the scavenging ports 128A and 128C should be prevented. In this case, the scavenging ports 128A and 128C must open independently in the wall of the power cylinder 102 so that direct connection between these two groups of scavenging ports is interrupted by the power piston 108. The interference which will occur between the crankcase compression and the supplementary scavenging pump when the phase difference between the top dead center of the power piston and the bottom dead center of the supplementary scavenging pump is larger than 15° is due to the fact that, even when the power pistons have passed their top dead center so as to perform their expansion stroke, the pump pistons are still performing their suction stroke, and therefore if the first passage 152 is not closed, the pump 300 takes in mixture from the first crankcase 124 thereby causing a corresponding amount of reduction of the mixture taken in through the carburetor 40, resulting in, as a matter of course, a corresponding reduction of the total intake of mixture effected by both the crankcases and the supplementary scavenging pump. The reed valve 160 is required to obviate this disadvantage.

After the first passage 152 has been closed, the pressure in the first crankcase 124 abruptly lowers in the vicinity of the bottom dead center of the power piston, as seen in FIG. 2. On the other hand, the pressure of the scavenging mixture supplied to the power cylinder 102 through the second passage 152 is still maintained at a high level in this phase region, and thereafter it abruptly lowers in the vicinity of the top dead center of the supplementary scavenging pump. The amount of scavenging mixture supplied to the power cylinder 102 through the second passage after the first passage has been closed is determined by the stroke volume of the supplementary scavenging pump, the stroke length remaining for the pump pistons 308 and 310 at the moment when the first passage 152 has been closed, the clearance volume included in the pump cylinder 302 and the second passage 154, etc..

The scavenging mixture compressed in the first crankcase 124 is delivered through the passage 138 and the first scavenging plenum 132A to the power cylinder 102 so as to be ejected into the cylinder through the scavenging ports 128A. On the other hand, the scavenging mixture compressed in the second crankcase 126 is delivered through the passage 140 and the second scavenging plenum 132B so as to be ejected from the scavenging ports 128B into the power cylinder 102. Since the first crankcase 124 is supplied with scavenging mixture compressed by the supplementary scavenging pump 300, at the scavenging port opening phase point So the pressure in the first crankcase 124 is substantially higher than the pressure in the second crankcase 126 which takes in scavenging mixture directly from the carburetor 40 without preliminary compression such as effected by the supplementary scavenging pump 300. However, owing to the shifting of the second scavenging ports 128B relative to the first scavenging ports 128A toward the side of the first crankcase 124, so that the opening phase point of the second scavenging ports 128B is closer to the bottom dead center of the power piston than the opening phase point of the first scavenging ports 128A, the crankcase pressure at the opening phase point So" of the second scavenging ports 128B is higher than the crankcase pressure at the scavenging port opening phase point So in an engine which employs only crankcase compression, so as more to approach the first crankcase pressure, as seen in FIG. 2. In FIG. 2 the one dot-one dash line shows the performance of the crankcase pressure in an engine utilizing conventional crankcase compression. It will be seen that the scavenging mixture from the second crankcase operates effectively to support the scavenging mixture from the first crankcase when the engine requires high pressure scavenging mixture in high speed operation. When the engine is operated in a relatively narrow rotational speed range, as in the case of an engine for driving a generator, high scavenging pressure is not necessarily required. However, even in this case it is required that the amount of scavenging mixture should be relatively large, and accordingly a supplementary scavenging pump is also required. In this case it is desirable that the first passage 152 should be branched to supply the delivery mixture from the first port 332 of the scavenging pump to both the first and the second crankcases 124 and 126. In this case the pressures in the first and second crankcases are the same as each other and their peak value is not so high as in the embodiment shown in FIGS. 3-6. Furthermore, when the first passage 152 is branched in the aforementioned manner, the clearance volume increases and the volumetric efficiency of the supplementary scavenging pump is somewhat reduced.

The supplementary scavenging pump 300 will now be described with respect to its stroke volume. As already described, the stroke volume of a supplementary scavenging pump is determined to be 0.35–0.85 times as large as the total stroke volume of a power cylinder-piston assembly to which the supplementary scavenging pump supplies scavenging mixture. Therefore, in the present embodiment the stroke volume of the pump cylinder-piston assembly 300 is determined to be 0.35–0.85 times as large as that of the power cylinder-piston assembly 100. A particular value which is to be selected within this range is determined as follows:

The rotational speed of the engine which will most frequently occur in full throttle operation of the engine is determined, and the stroke volume of the pump 300 is determined so that it delivers scavenging mixture of an amount which will just scavenge the exhaust gases existing in the power cylinder out of the exhaust ports 130 when they are closed by the power piston 110 when the engine is operating at said most frequent full throttle rotating speed. The pressure in the pump cylinder 302 varies as shown in FIG. 2, and the pressure in the first crankcase at the scavenging port opening phase point (So) has the value of the point designated by So. At this pressure scavenging mixture is ejected through the first scavenging ports 128A into the cylinder 102, although the pressure is slightly reduced by the throttling action at the scavenging ports. The scavenging mixture ejected from the scavenging ports 128A forms spiral flows in the cylinder which urge the exhaust gases existing in the cylinder toward the exhaust ports 130. In this connection, it is the scavenging mixture ejected from the scavenging ports 128Ab which forms spiral flows, while the scavenging mixture ejected from the scavenging ports 128Aa flows along the central axis of the power cylinder. However, the major flow of scavenging mixture in the power cylinder is the spiral flows formed by the scavenging mixture ejected from the scavenging ports 128Ab, and therefore the time required for scavenging mixture to reach the exhaust ports is determined by the difference between the pressure of the scavenging mixture and that of the exhaust gases existing in the cylinder, and by the length of the spiral path travelled by the scavenging mixture while it flows from the scavenging port to the exhaust port. This time duration is not directly related with the rotational speed of the engine. Therefore, if the shape and arrangement of the scavenging and exhaust ports are determined, this time duration is determined by the scavenging pressure at the phase point So and by its subsequent pattern of change. As seen in FIG. 2, in this embodiment the pressure of the scavenging mixture ejected from the first scavenging ports 128A gradually increases from the phase point So, and therefore the scavenging mixture which has first been ejected into the power cylinder is well supported by the mixture subsequently ejected from the same scavenging ports, whereby scavenging of the exhaust gases by the mixture is effectively performed. After a lapse of time from the phase point So the third scavenging ports 128C are further opened, and the scavenging mixture supplied directly from the supplementary scavenging pump 300 through the second passage 154 is ejected at the pressure of the point So', and after a further lapse of time the second scavenging ports 128B are opened, whereby the mixture supplied from the second crankcase 126 through the passage 140 is ejected into the power cylinder at the pressure of point So" so as to support the preceding mixture. After the first passage 152 has been closed, supply of scavenging mixture from the first crankcase 124 is weakened, although the supply of scavenging mixture from the first scavenging ports 128A still continues. The scavenging by the second crankcase 126 through the second scavenging ports 128B is also maintained. These scavengings by the first and second crankcases are rapidly weakened as the power piston approaches its BDC. However, these scavengings are still maintained for a while even after the bottom dead center of the power piston. On the other hand, the scavenging mixture supplied through the second passage 154 continues to flow into the power cylinder at high pressure until it fades out after the lapse of a time after the top dead center of the scavenging pump.

If the suction inertia is neglected, the volumetric efficiency of a reciprocating pump becomes higher as its rotational speed becomes lower. Furthermore, the time required for the scavenging mixture to travel from the scavenging ports to the exhaust ports is determined by scavenging pressure, exhaust pressure, arrangement of the scavenging and exhaust ports, etc., and is not directly concerned with the rotational speed of the engine. Therefore, if the engine is so arranged that, at a certain rotational speed (which is called "matching rotational speed") when scavenging mixture has just pushed exhaust gases out of the exhaust ports, the exhaust ports are closed, then below the matching rotational speed a blow-out escaping of mixture to the exhaust manifold will occur, while on the other hand above the matching rotational speed exhaust gases will remain in the cylinder 102. Therefore, if it is intended that the engine should produce high torque at high rotational speed, the stroke volume of the pump 300 must be increased so as to increase the scavenging pressure. In this case, when the engine is operated at low speed with full throttle, the blow-out of mixture to the exhaust manifold will increase. When there exists an exhaust inertia effect in the exhaust pipe this will also affect the time required for the exhaust gases to reach the exhaust ports. If the stroke volume of the supplementary pump is too small, due to the effect of the clearance volume of the first crankcase and the throttling action by the scavenging ports, the scavenging pressure at the scavenging port opening phase point So will not be high enough, so that the scavenging pressure will remain almost without increasing after the opening of the scavenging ports or will abruptly lower. On the other hand, if the stroke volume of the supplementary pump is too large, the scavenging pressure after So will become too high. In this case, due to such a high scavenging pressure the scavenging mixture will mix with exhaust gases so as to cause the blow-out of scavenging mixture to the exhaust manifold, thereby reducing scavenging efficiency, while on the other hand a part of the scavenging mixture delivered from the supplementary pump will remain in the passage located before the scavenging ports, without being effectively introduced into the power cylinder 102, when the scavenging ports are closed. If a large amount of scavenging mixture remains in such a passage, although a part of the work consumed for the compression of scavenging mixture is recovered as a force for driving the pump in the next suction stroke, pumping power required will increase, thereby decreasing the effective output power of the engine. Furthermore, since in this case a correspondingly large amount of scavenging mixture remains in the pump 300 after the first passage has been closed, if a large amount of scavenging mixture is supplied through the second passage 154 having a larger throttling effect, the power required for driving the pump increases, thereby increasing the load of the engine so as to decrease the effective output power of the engine.

The aforementioned lower and upper limits with respect to the ratio of the stroke volume of the pump cylinder-piston assembly 300 to that of the power cylinder-piston assembly 100 are two of the factors which are necessary for the scavenging by high pressure and a large amount of scavenging mixture which scavenging is one of the features of the present invention, and have the following characters. In conventional two-stroke cycle engines depending only upon crankcase compression, the delivery ratio is about between 0.5–0.8. Now, let us assume that the stroke volume of the supplementary scavenging pump 300 is 0.85 times as large as the stroke volume of the power cylinder-piston assembly 100, the ratio of the delivery amount to the stroke volume of the supplementary pump is 80%, and that a part of this delivery amount remains in the crankcase so that 80% of the delivery amount is actually supplied to the power cylinder 102. Further let us assume that, if the supplementary scavenging pump 300 is not provided, the delivery ratio by the crankcase compression due to crankcases 124 and 126 is 0.55. In this case, the delivery ratio L in this embodiment is given as follows:

$$L = 0.85 \times 0.8 \times 0.8 + 0.55 = 0.54 + 0.55 = 1.09 \quad (1)$$

Let it be assumed that the pressure of the scavenging mixture in the power cylinder 102 at the scavenging port closing point Sc is about 1.3 ata (absolute pressure) and that the density of the scavenging mixture in this condition, corrected with regard to temperature increase from atmospheric temperature, is 1.3 times as large as that of atmospheric air. Then, expressing the stroke volume of the power cylinder-piston assembly 100 by Vs, the volume Vsc of scavenging mixture supplied to the power cylinder 102 is expressed as follows:

$$Vsc = 1.09 Vs/1.3 = 0.84 Vs \quad (2)$$

The volume Vec of the space confined between the two opposed power pistons in the power cylinder when the exhaust ports are closed by the power piston is expressed as follows:

(3)     Vec = Vs − 2 × (stroke volume displaced by the power piston of the exhaust port side while it moves from its BDC until it -continued

| | closes the exhaust ports) |
|---|---|
| + | (volume of the combustion chamber defined between the two power pistons positioned at their TDC) |

The second item in the above formula is about 0.30 Vs. Further, if the nominal compression ratio, i.e. the ratio of the stroke volume of the power cylinder-piston assembly to the volume of the combustion chamber defined between the two power pistons positioned at their top dead centers, is about 7, the third term in the above formula is about 0.14 Vs. Therefore, in this case the above formula is rewritten as follows:

$$Vec = (1 - 0.30 + 0.14)Vs = 0.84\ Vs \quad (4)$$

In this case, therefore, Vec is equal to Vsc, and therefore the scavenging mixture just clears the exhaust gases out of the power cylinder so that it fully occupies the space defined in the power cylinder when the exhaust ports are closed. In this case, if no leakage of scavenging mixture occurs through the scavenging ports, the volumetric efficiency of the power cylinder is $0.84 \times 1.3$, which is 1.09, i.e. 109%. As noted from the above example, by reducing the clearance volume of the crankcase, by increasing the delivery ratio due to crankcase compression, and by reducing the portion of the scavenging mixture delivered from the supplementary scavenging pump which remains in the crankcase, the stroke volume of the supplementary scavenging pump required for ensuring the same amount of scavenging mixture is reduced.

On the other hand, in the case of the supplementary scavenging pump having stroke volume which is 0.35 times as large as that of the power cylinder-piston assembly, if it is assumed that the ratio of the delivery volume to the stroke volume of the supplementary scavenging pump is also 80%, that 20% of the scavenging mixture delivered from the supplementary scavenging pump remains in the crankcase, and that the delivery ratio due only to crankcase compression is 0.55, the delivery ratio L is given by the following:

$$L = 0.35 \times 0.8 \times 0.8 + 0.55 = 0.22 + 0.55 = 0.77 \quad (5)$$

If the delivery ratio due only to crankcase compression is 0.8, the delivery ratio L will be:

$$L = 0.35 \times 0.8 \times 0.8 + 0.8 = 0.22 + 0.8 = 1.02 \quad (6)$$

If no leakage of scavenging mixture occurs until the exhaust ports are closed, the volumetric efficiency in the former case is 77%, and in the latter case is 102%. Therefore, in accordance wih the design conditions with regard to which value in the range of about 75–100% is selected for the volumetric efficiency of the power cylinder and with regard to which value is selected for the delivery ratio due only to crankcase compression, the stroke volume required for the scavenging pump is changed.

Next, considerations with respect to the scavenging pressure are made. The clearance volume due only to crankcase compression is generally 2–3 Vs, and therefore the compression ratio is 1.5–1.3. If a special design such as to fill up the back of the piston is used, the clearance volume can be reduced to about 1.3 Vs (compression ratio = 1.75). As an example, assuming that the scavenging mixture delivered from the supplementary scavenging pump is supplied only to the first crankcase 124, that the clearance volume of the first crankcase is, expressing the stroke volume of the first crankcase by Vss ($= \frac{1}{2}$ Vs), 2 Vss, that the stroke volume of the supplementary scavenging pump is 0.85 Vs = $2 \times 0.85$ Vss, that the clearance volume of the supplementary scavenging pump and the first passage 152 is, in sum, 0.15 Vss, that the crank angle between the bottom dead center of the supplementary scavenging pump and the scavenging port opening phase point So is 90°, and that the volume of the second passage 154 is negligible, then the maximum volume of the system composed of the supplementary scavenging pump 300, the first crankcase 124 and the first passage 152 is the sum of the volume of the first crankcase (3 Vss), the stroke volume of the supplementary scavenging pump (1.7 Vss), and the clearance volume of the first passage (0.15 Vss), that is,:

$$3Vss + 1.7Vss + 0.15Vss = 4.85Vss \quad (7)$$

On the other hand, the volume of the aforementioned system at the scavenging port opening phase point So is as follows. Since the crank angle between the scavenging port opening phase point So and the bottom dead center of the power piston is 60°, the volume of the first crankcase is:

$$2Vss + (\tfrac{1}{4})Vss = 2.25Vss \quad (8)$$

Further, since the crank angle between the bottom dead center of the supplementary scavenging pump and the scavenging port opening phase point So is 90°, at the scavenging port opening phase point the pump piston of the supplementary scavenging pump is just at halfway in its stroke. Therefore the volume defined by the supplementary scavenging pump and the first passage is:

$$\tfrac{1}{2} \times 1.7Vss + 0.15Vsss = 1.0Vss \quad (9)$$

Therefore, the volume of the aforementioned system at this moment is:

$$2.25Vss + 1.0Vss = 3.25Vss \quad (10)$$

Therefore, the compression ratio CRso at the scavenging port opening phase point So is:

$$CRso = 4.85Vss/3.25Vss = 1.49 \quad (11)$$

Since the volumetric efficiency in the suction of mixture in the first crankcase and the supplementary scavenging pump is less than 100%, when the compression ratio CRso is 1.49, the scavenging pressure at the scavenging port opening phase point So will be about 1.4 ata.

Based upon the above conditions, when the crank angle between the bottom dead center of the supplementary scavenging pump and the scavenging port opening phase point So is $90° + 15° = 105°$, the compression ratio CRso is as follows:

$$\begin{aligned}(12)\quad CRso &= 4.85\ Vss/[2.25\ Vss + (1.7/2)(1 + \cos 105°)\ Vss + 0.15\ Vss] \\ &= 4.85\ Vss/(2.25\ Vss + 0.63\ Vss + 0.15\ Vss) \\ &= 4.85/3.03 = 1.60\end{aligned}$$

Based upon the above conditions, when the crank angle between the bottom dead center of the supplementary scavenging pump and the scavenging port opening phase point So is 90°−15°=75°, the compression ratio CRso is as follows:

(13)  CRso = 4.85 Vss/[2.25 Vss + (1.7/2) (1 + cos 75°) Vss + 0.15 Vss]
      = 4.85 Vss/(2.25 Vss + 1.07 Vss + 0.15 Vss)
      = 4.85/3.47 = 1.40

Further, based upon the above conditions, if the scavenging mixture delivered from the supplementary scavenging pump is equally supplied to both the first and the second crankcases 124 and 126, the compression ratio CRso is as follows:

(14)  CRso = (3 Vss + 0.85 Vss + 0.15 Vss)
      /[2.25 Vss + (½) × 0.85 Vss + 0.15 Vss]
      = 4/2.825 = 1.41

Next, assuming that the stroke volume of the supplementary scavenging pump is $0.35 Vs = 2 \times 0.35$ Vss, that the scavenging mixture delivered from the supplementary scavenging pump is supplied only to the first crankcase 124, that the clearance volume of the first crankcase is 1.3 Vss, that the clearance volume of the supplementary scavenging pump and the first passage is, in sum, 0.15 Vss, that the crank angle between the bottom dead center of the supplementary scavenging pump and the scavenging port opening phase point So is 105°, that the crank angle between the scavenging port opening phase point So and the bottom dead center of the power piston is 60°, and that the volume of the second passage 154 is negligible, the compression ratio CRso is as follows:

(15)  CRso = (2.3 Vss + 2 × 0.35 Vss + 0.15 Vss)
      /[(1.3 + 0.25) Vss + (2 × 0.35/2) ×
      (1 + cos 105°) Vss + 0.15 Vss]
      = 3.15/(1.55 + 0.259 + 0.15) = 1.61

As apparent from the above examples, when the clearance volume of the crankcase is smaller, when the stroke volume of the supplementary scavenging pump is larger, and when the crank angle between the bottom dead center of the supplementary scavenging pump and the scavenging port opening phase point So is larger, the pressure of the scavenging mixture supplied to the power cylinder at the scavenging port opening phase point So becomes higher, and this scavenging pressure is higher when the scavenging mixture from the supplementary scavenging pump is supplied only to one crankcase than when the scavenging mixture is supplied from the supplementary scavenging pump to the both crankcases. However, it is to be noted that, if the stroke volume of the supplementary scavenging pump is too much increased, the amount of scavenging mixture becomes excessive so as to cause a blow-out of scavenging mixture to the exhaust manifold, while requiring greater power for driving the supplementary scavenging pump with a portion of the power being lost uselessly. Further, if the crank angle between the bottom dead center of the supplementary scavenging pump and the scavenging port opening phase point So is too large, the duration of supply of scavenging mixture after the bottom dead center of the power piston becomes undesirably small.

Next, the first passage closing phase point is considered. It is desirable that the crank angle between the scavenging port opening phase point So and the bottom dead center of the power piston should be 60° or more and that over at least half of this crank angle the delivery of the supplementary scavenging pump should be employed for increasing the pressure of scavenging mixture in the first crankcase. On the other hand, regardless of whether scavenging mixture is supplied from the supplementary scavenging pump or not, the pressure in the crankcase lowers, due to its own performance, rapidly in the vicinity of the bottom dead center of the power piston. Therefore, in order to ensure the pressure in the second passage, it is required that the first passage should be closed before the delivery pressure of the supplementary scavenging pump lowers by a substantial extent due to the lowering of the pressure in the first crankcase. From this point of view, it is desirable that the first passage closing phase point should be 10°−30° in advance of the bottom dead center of the power piston. A particular phase point to be actually selected in this range is determined by such factors as: if it is regarded as important that long effective scavenging should be ensured in the latter half of the scavenging period; or instead if it is regarded as important that turbulent flows should be generated in the power cylinder by jets of the scavenging mixture supplied through the second passage; how high the scavenging pressure at the scavenging port opening phase point So should be (in this case, since the crank angle between the bottom dead center of the supplementary scavenging pump and the scavenging port opening phase point So becomes larger as the aforementioned scavenging pressure is made higher, the portion of the stroke volume of the supplementary scavenging pump remaining at the first passage closing phase point becomes smaller); stroke volume of the supplementary scavenging pump (this is related with the amount of scavenging mixture which remains in the supplementary scavenging pump after the first passage closing phase point); throttling ratio of the second passage (if this throttling ratio is large, and if the amount of scavenging mixture which remains in the supplementary scavenging pump at the first passage closing phase point is also large, it will happen that all of the scavenging mixture delivered from the supplementary scavenging pump will not be supplied to the power cylinder by the time the second passage is closed), etc.

By taking the aforementioned various factors and conditions into consideration in view of the performance required from an engine, a test engine is manufactured, and, in accordance with experiment, various conditions are modified so as to satisfy the requirements with regard to engine performance and with regard to exhaust gas purification. As a result of such experimental researches, we have found that, when the total stroke volume of the supplementary scavenging pump is 0.35–0.85 times as large as the total stroke volume of the power cylinder-piston assembly to which the supplementary scavenging pump supplies scavenging mixture, when the bottom dead center of the supplementary scavenging pump is in the range between 15° in advance of and 15° behind the phase point which is 90° in advance of the scavenging port opening phase point So, and when the first passage closing phase point is in a range between 10°−30° in advance of the bottom dead center of the power piston, the engine having the basic structure of the present invention can exhibit its distinguished features with regard to engine performance and exhaust gas purification.

Figure 7:
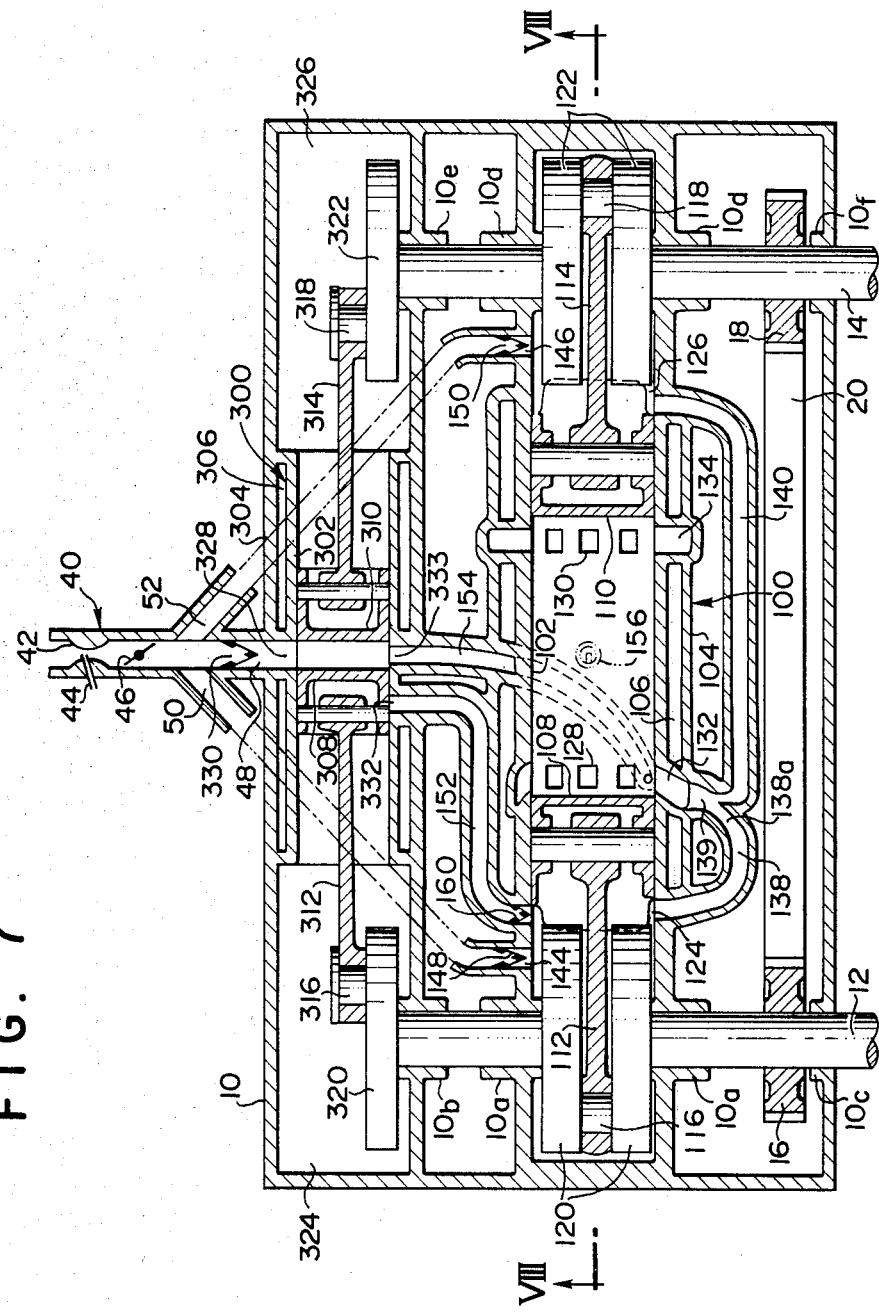
FIG. 7 is a diagrammatical plan sectional view showing a second embodiment of the two-stroke cycle gasoline engine of the present invention.
Figure 8:
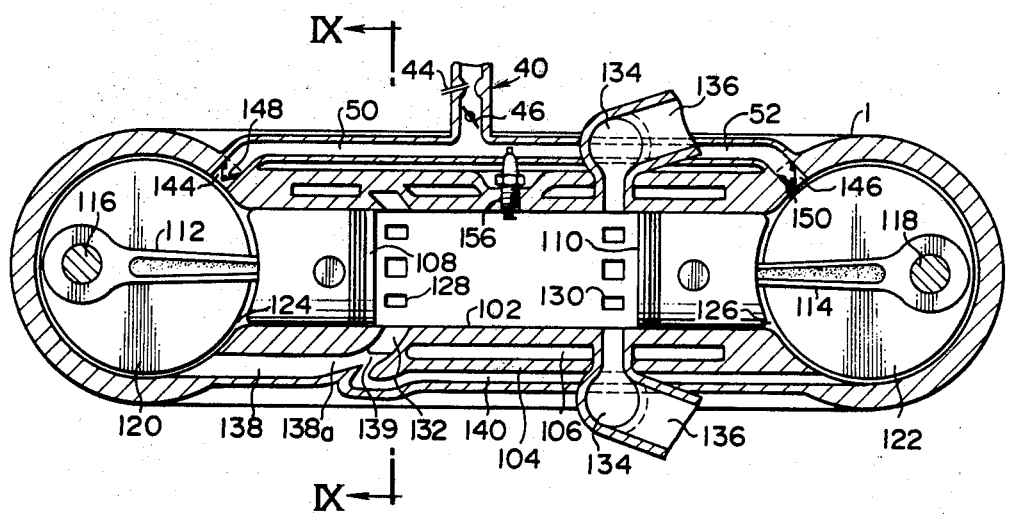
FIG. 8 is a sectional view along line VIII—VIII in FIG. 7.
Figure 9:
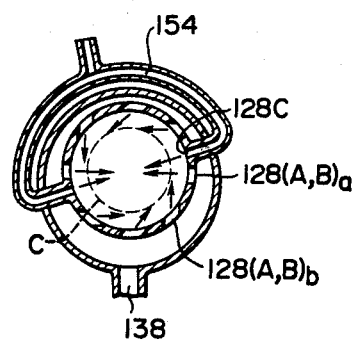
FIG. 9 is a sectional view along line IX—IX in FIG. 8.
Figure 10:
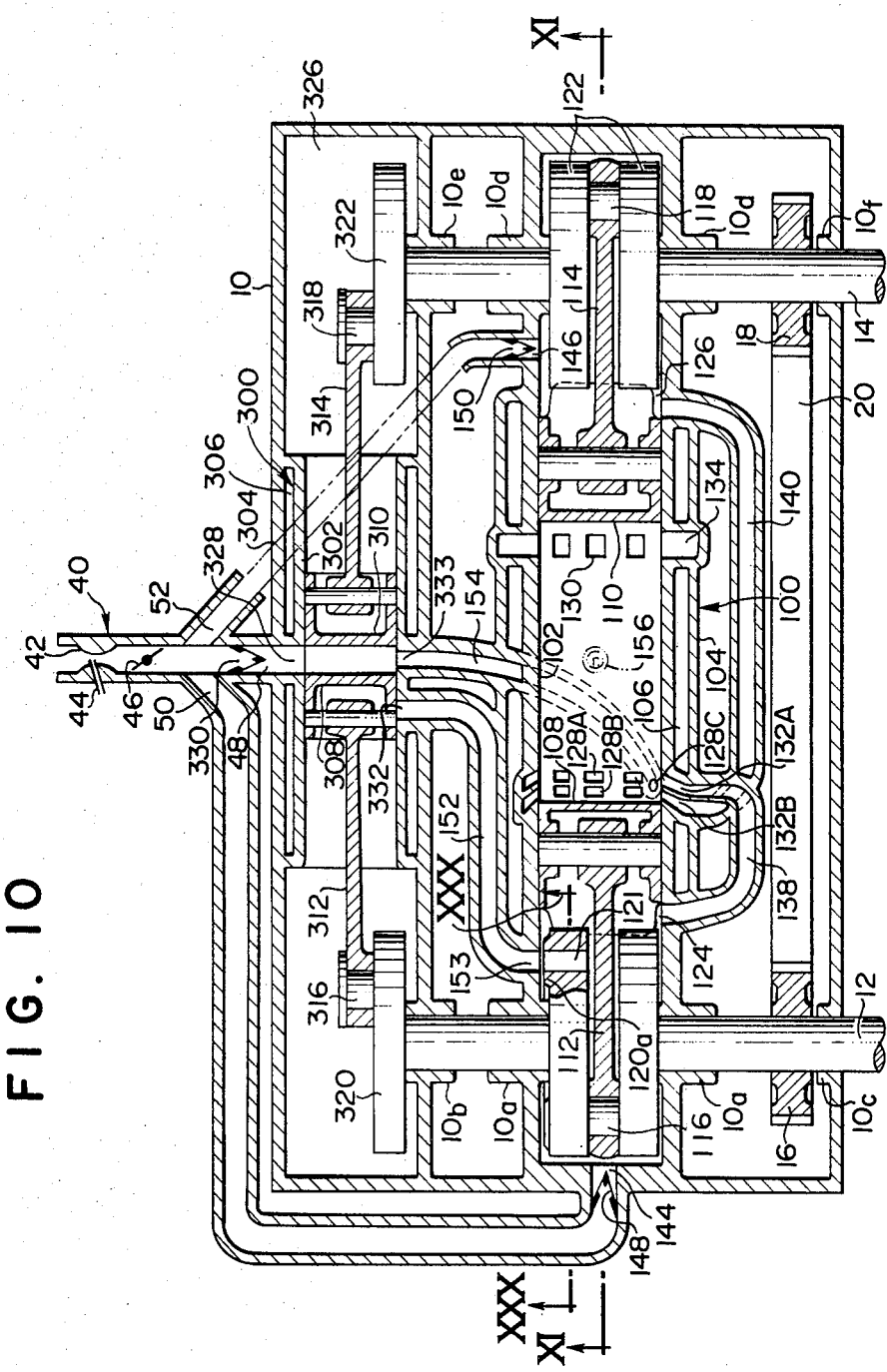
FIG. 10 is a diagrammatical plan sectional view showing a third embodiment of the two-stroke cycle gasoline engine of the present invention.

FIG. 7 is a diagrammatical plan sectional view showing a second embodiment of the engine of the present invention; FIG. 8 is a sectional view along line VIII—VIII in FIG. 7; and FIG. 9 is a sectional view along line IX—IX in FIG. 8. This second embodiment is different from the first embodiment shown in FIGS. 3-6 with regard to the structure of the scavenging ports and the scavenging plenum. Therefore, the portions in FIGS. 7-9 which correspond to those shown in FIGS. 3-6 are designated by the same reference numerals as in FIGS. 3-6. Instead of the first and second scavenging ports 128A and 128B in the first embodiment, in this second embodiment only one group of scavenging ports 128 are provided. Corresponding to this modification the two scavenging plenums 132A and 132B in the first embodiment are replaced by a single scavenging plenum 132 in this second embodiment. The structure for supplying scavenging mixture to this single scavenging plenum includes a jet portion 138a formed adjacent to the scavenging plenum 132 at a portion of the passage 138 which conducts scavenging mixture from the first crankcase 124 to the scavenging plenum and the passage 140 which conducts scavenging mixture from the second crankcase 126 to the scavenging plenum is connected to the passage 138 at the jet portion 138a. In this case, as seen in FIG. 7, the angle formed between the passages 138 and 140 at their upstream side of their joining point is an acute angle so that the flow of scavenging mixture ejected from the passage 140 toward the jet portion 138a has a velocity component directed toward the scavenging plenum 132.

As seen in FIG. 2, it is slightly before the scavenging port opening phase point So that the pressure in the first crankcase 124 becomes substantially higher than that in the second crankcase 126. Therefore, it is slightly before the scavenging port opening phase point So that the pressures of the scavenging mixtures in the passages 138 and 140, both having increased at the same rate, break their balance at the joining point 139 so that the pressure of the scavenging mixture in the passage 138 becomes higher than that of the scavenging mixture in the passage 140. Therefore, since the scavenging ports 128 are opened soon after the balance between the pressures in the passages 138 and 140 has been broken, the joining point 139 is soon traversed by the strong flow of scavenging mixture generated in the jet portion 138a to flow toward the scavenging plenum 132 thereby substantially suppressing flow of scavenging mixture from the passage 138 to the passage 140 past the joining point, thereby obviating the danger of causing reverse flow of scavenging mixture through the passage 140 toward the second crankcase 126. Thus, the pressure in the first crankcase 124 is effectively increased by the scavenging mixture supplied from the supplementary scavenging pump 300, so that when the scavenging ports 128 are opened a large amount of scavenging mixture at a high pressure is supplied through the passage 138 toward the scavenging ports. In this case, due to a slight throttling action effected by the jet portion 138a, pressure is built up in the scavenging plenum 132. As a result, flow of scavenging mixture through the passage 140 is suppressed. On the other hand, the mixture in the second crankcase 126 is further compressed as the power piston moves toward its bottom dead center so that the pressure in the second crankcase increases as seen in FIG. 2.

Thus, when the pressure in the second crankcase has sufficiently increased, and when the velocity of mixture in the jet portion 138a has increased to a certain level, supply of scavenging mixture from the passage 140 to the scavenging plenum 132 begins. This turning point is shown by So" in FIG. 2. Thereafter, as the flow velocity in the jet portion 138a increases, suction is applied to the passage 140 by the jet portion 138a so as to expedite supply of scavenging mixture through the passage 140.

Other structures and functions with regard to the second embodiment shown in FIGS. 7-9 are the same as those in the first embodiment shown in FIGS. 3-6, and therefore descriptions of these common structures and functions will be omitted in order to avoid duplication.

Figure 14:
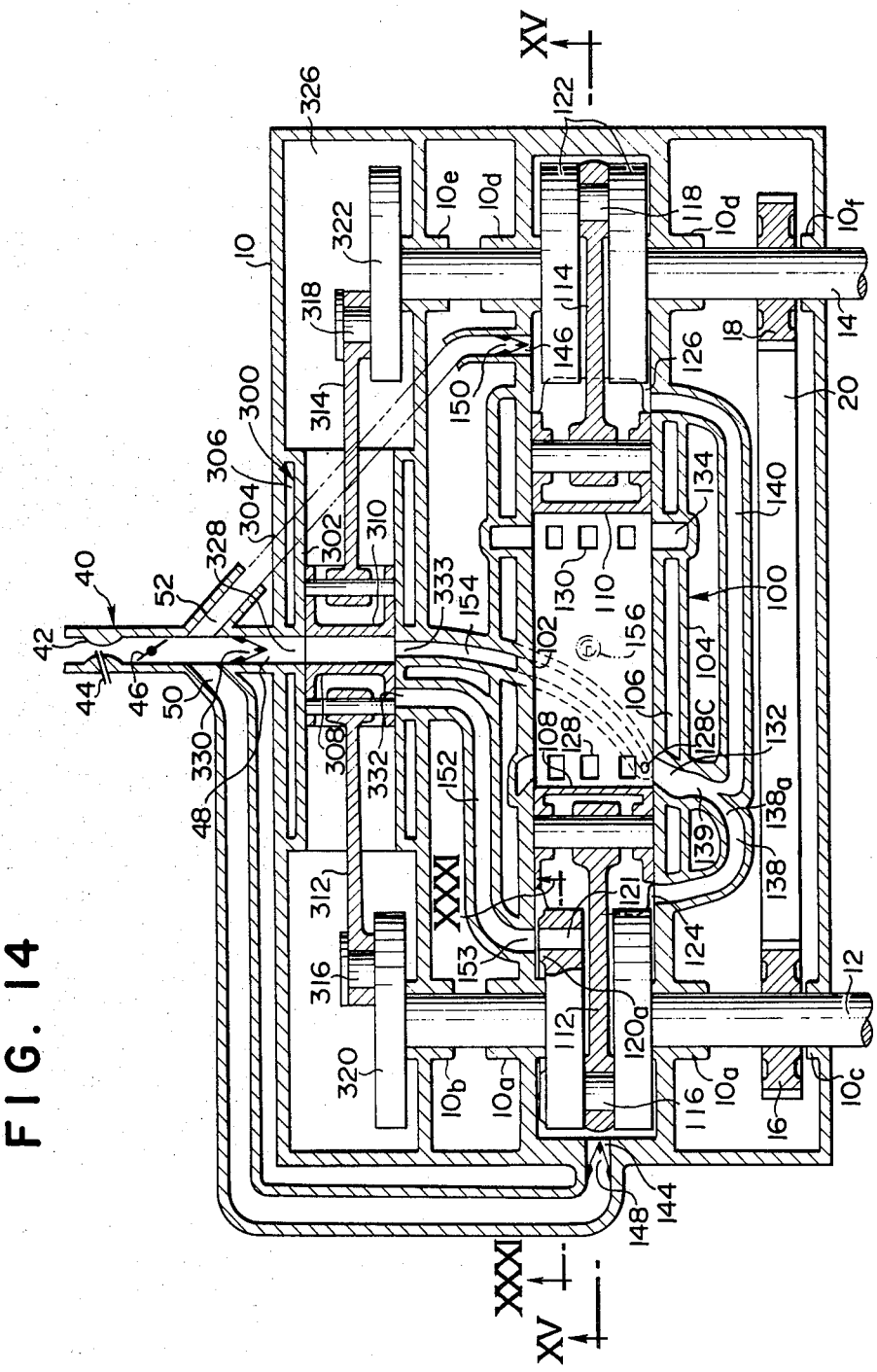
FIG. 14 is a diagrammatical plan sectional view showing a fourth embodiment of the two-stroke cycle gasoline engine of the present invention.
Figure 15:
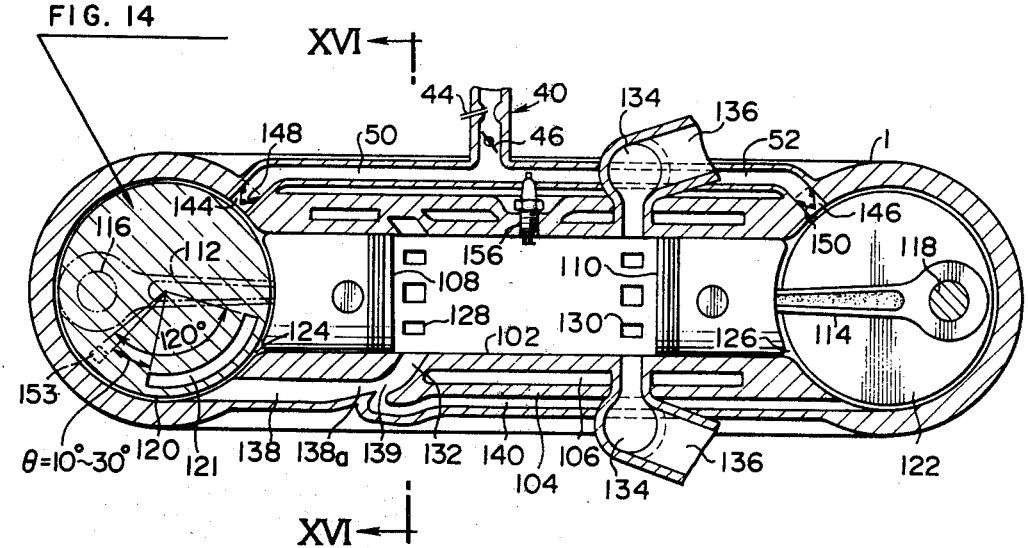
FIG. 15 is principally a sectional view along line XV—XV in FIG. 14, wherein a sectional view along line XXXI—XXXI in FIG. 14 is partially incorporated.
Figure 16:
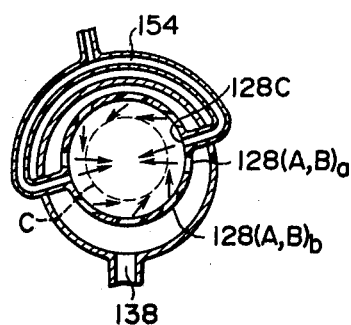
FIG. 16 is a sectional view along line XVI—XVI in FIG. 15.

In the first embodiment shown in FIGS. 3-6 and in the second embodiment shown in FIGS. 7-9 the reed valve 160 provided in the first passage 152 is actually relatively large and involves the problem that the clearance volume of the first passage becomes relatively large. This problem is particularly serious in a small-sized engine. In view of this, it is proposed to abolish the reed valve 160 and to incorporate a valve structure in the crank portion which comprises an opening formed in the wall of the crankcase 124 and a valve element incorporated in the crankcase 120 which selectively closes said opening in accordance with the rotation of the crank arm so as to isolate the connection between the first passage connected to said opening and the crankcase 124 over the phase period in which a reverse flow of mixture from the crankcase 124 to the first passage 152 would otherwise occur. The third embodiment shown in FIGS. 10-13 and the fourth embodiment shown in FIGS. 14-16 are embodiments which incorporate such a valve structure controlled by the crank arm. The third structure shown in FIGS. 10-13 is an embodiment obtained by incorporating the aforementioned valve structure in the first embodiment shown in FIGS. 3-6. Similarly, the fourth embodiment shown in FIGS. 14-16 is obtained by incorporating the aforementioned valve structure in the second embodiment shown in FIGS. 7-9. In FIGS. 10-13 and in FIGS. 14-16 the portions corresponding to those shown in FIGS. 3-6 and in FIGS. 7-9 are designated by the same reference numerals.

Figure 17:
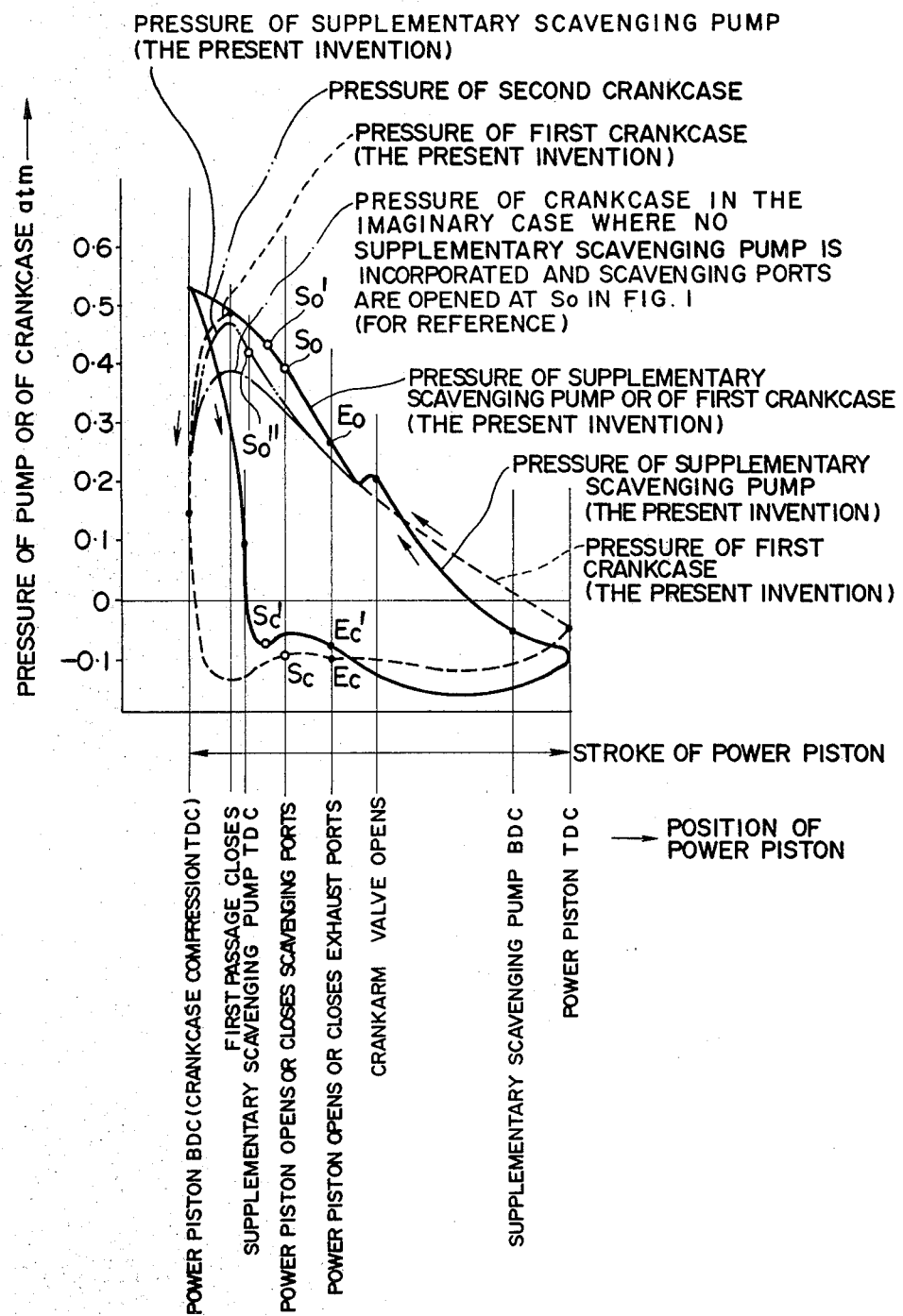
FIG. 17 is an indicator diagram similar to that shown in FIG. 2, modified to show the pressures of the supplementary scavenging pump and the crankcase compression relative to the position of the power piston in said third and fourth embodiments of the present invention.

Referring to FIGS. 10-16 showing the third and fourth embodiments, one of the crank arms 120 is formed with an annular land portion 120a which faces a port 153 formed in the wall of the first crankcase 124 and connected with the first passage 152, and an arcuate opening 121 is formed through the thickness of the crank arm disc so as to open the port 153 to the crankcase over a certain phase range during rotation of the crank arm. It is sufficient if the opening 121 is so formed that it opens the port 153 from a phase point which is 60° in advance of the scavenging port opening phase point So. This is due to the fact that, as seen in FIG. 17 which shows the relation between the pressure of the supplementary scavenging pump or the pressure in the crankcase and the position of the power piston with regard to the third and fourth embodiments, the pressure of the supplementary scavenging pump is not substantially higher than the pressure in the first crankcase before the aforementioned phase point, making it useless to open the port 153 before the aforementioned phase point. The aforementioned 60° may be reduced in some designs. However, if this angle is much smaller than 60°, there occurs a problem that in high speed operation of the engine the flow of scavenging mixture is delayed so that the pressure in the first crankcase is not sufficiently increased by the scavenging mixture from the supplementary scavenging pump when the scavenging ports are opened at the phase point So.

Figure 11:
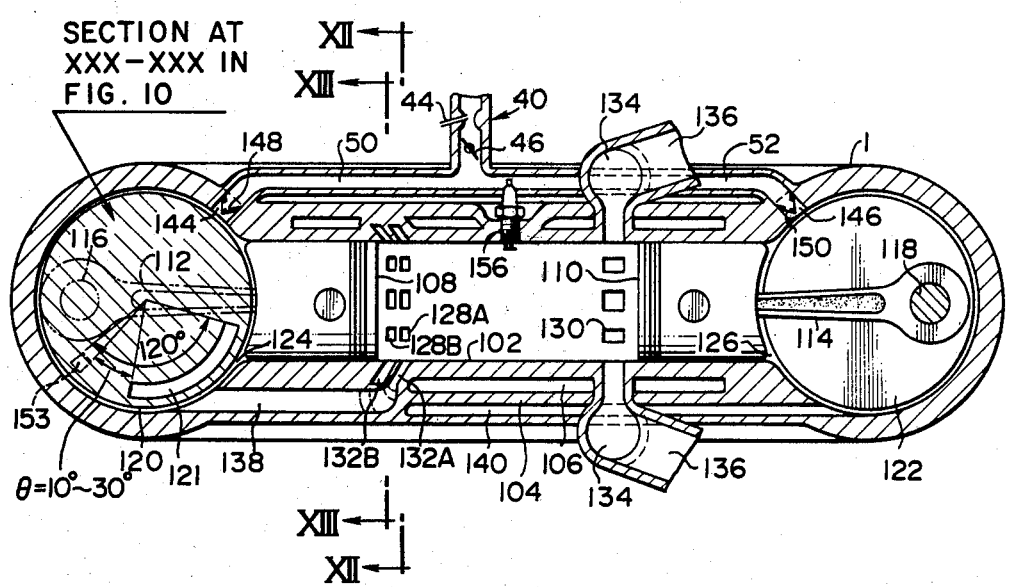
FIG. 11 is principally a sectional view along line XI—XI in FIG. 10, wherein a sectional view along line XXX—XXX in FIG. 10 is partially incorporated.
Figure 12:
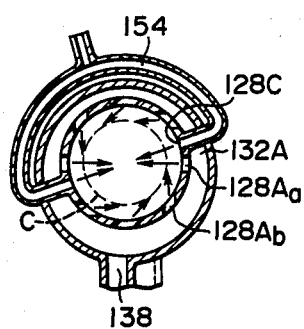
FIGS. 12 and 13 are sectional views along lines XII—XII and XIII—XIII in FIG. 11.
Figure 13:
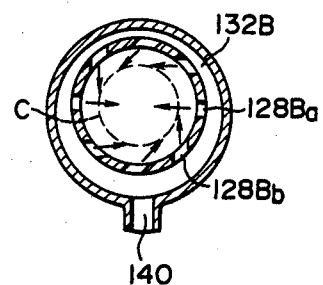

The sectional views XXX—XXX and XXXI—XXXI in FIGS. 11 and 15 show the valve structures in the state where the power pistons are at their bottom dead center. Therefore, the angle "theta" in these figures gives the phase point at which the port 153 is closed by the land portion 120a, i.e., this angle corresponds to the crank angle between the first passage closing phase point and the bottom dead center of the power piston. Therefore, when this angle is selected to be in a range of 10°–30°, this slide valve mechanism can also be employed as a control mechanism for closing the first passage at a phase point which is 10°–30° in advance of the bottom dead center of the power piston. In this case, the first delivery port 332 of the supplementary scavenging pump 300 may be provided at the same position as the second delivery port 333. Since in this system no pressure drop such as caused by the reed valve 160 is involved when the port 153 is opened through the opening 121, the pressure of the supplementary scavenging pump and the pressure in the first crankcase are substantially the same in this open phase region, as seen in FIG. 17. In this connection, it is to be noted that if the closure of the first passage 152 at a phase point such as 10°–30° in advance of the bottom dead center of the power piston is controlled by the position of the first delivery port 332, the valving function of the annular land portion 120a, which is to close the port 153 unless the arcuate opening 121 aligns with the port 153, is only to avoid a reverse flow of mixture being caused from the crankcase toward the pumping chamber of the supplementary scavenging pump in a phase region in the vicinity of the top dead center of the power piston and of the bottom dead center of the supplementary scavenging pump wherein the crankcase begins to perform its compression stroke while the supplementary scavenging pump is still performing its suction stroke, and therefore that it is not required that the annular land portion 120a should perfectly close the port 153 when the arcuate opening 121 is not in alignment with the port 153. In other words, the port closing function applied by the land portion 120a to the port 153 need only be of such an extent as to be sufficient in view of the abovementioned object.

Other structures and functions with regard to the third embodiment shown in FIGS. 10–13 are the same as those in the first embodiment shown in FIGS. 3–6. Similarly, other structures and functions with regard to the fourth embodiment shown in FIGS. 14–16 are the same as those in the second embodiment shown in FIGS. 7–9. Therefore, detailed descriptions of these common structures and functions will be omitted in order to avoid duplication.

Figure 18:
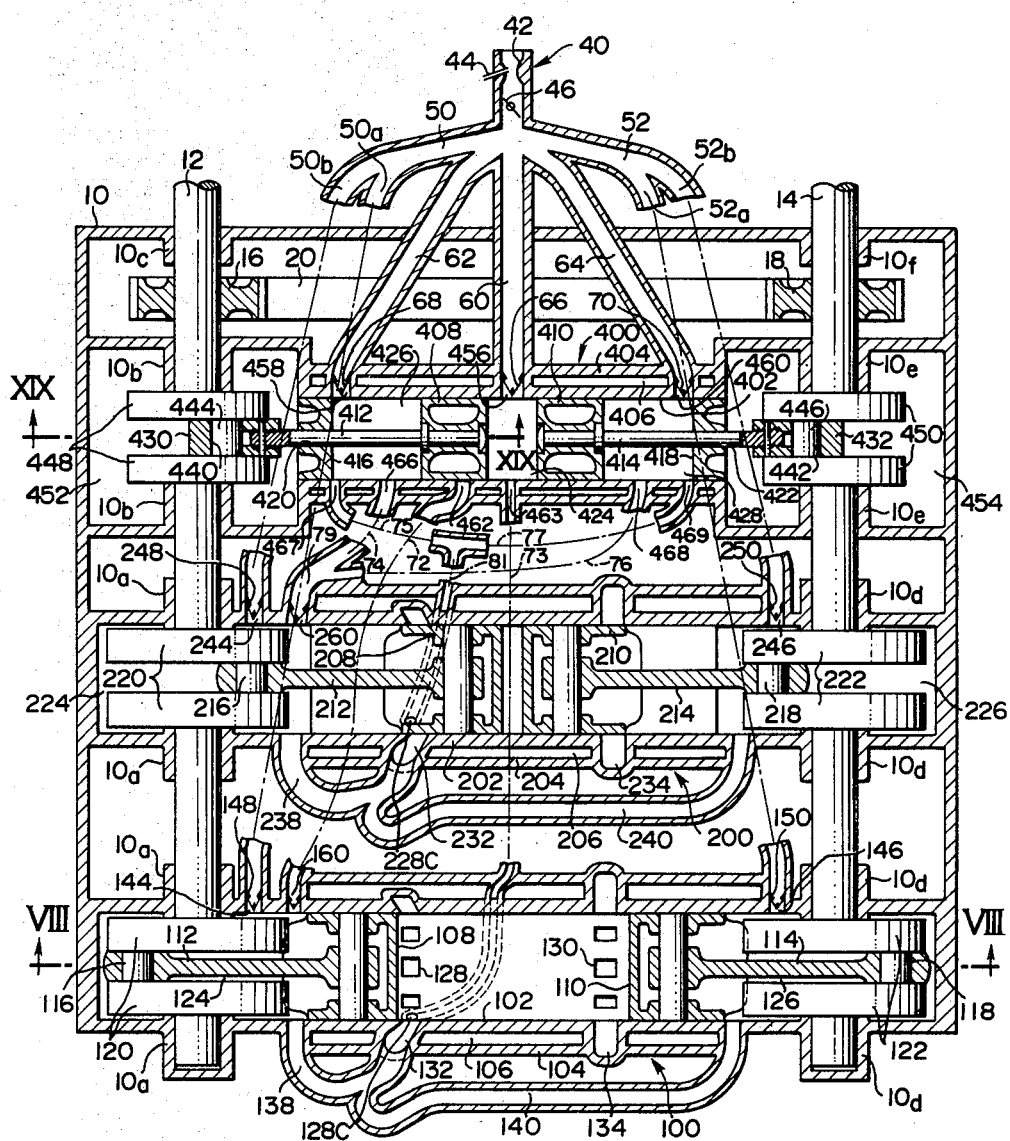
FIG. 18 is a diagrammatical plan sectional view showing a fifth embodiment of the two-stroke cycle gasoline engine of the present invention.
Figure 19:
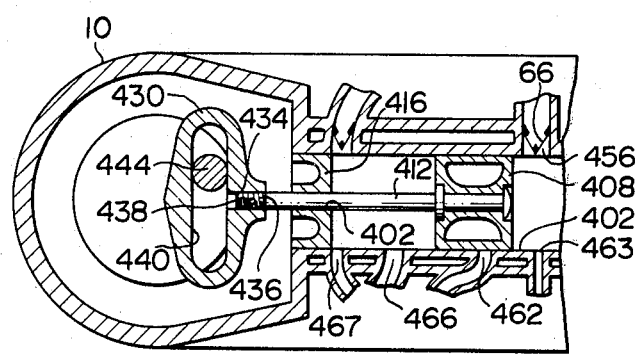
FIG. 19 is a sectional view along line XIX—XIX in FIG. 18.

FIG. 18 is a diagrammatical plan sectional view of a fifth embodiment, and FIG. 19 is a sectional view along line XIX—XIX in FIG. 18. This fifth embodiment includes, in addition to the power cylinder-piston assembly 100 having two horizontally opposed pistons and incorporating uniflow scavenging of the same structure as that of the second embodiment shown in FIGS. 7–9, a second power cylinder-piston assembly 200 of substantially the same structure as the power cylinder-piston assembly 100. In FIG. 18, therefore, the portions of the second power cylinder-piston assembly 200 corresponding to those in the first power cylinder-piston assembly 100 are designated by reference numerals which are the reference numerals attached to the corresponding portions of the first cylinder-piston assembly 100, each increased by 100. As apparent from FIG. 18, the power pistons 108 and 110 of the first power cylinder-piston assembly 100 and the power pistons 208 and 210 of the second power cylinder-piston assembly 200 are shifted apart by a phase difference of 180°.

In the engine having these two power cylinder-piston assemblies, in order to make the supplementary scavenging pump dimensionally better adapted to the two power cylinder-piston assemblies, and in order to construct the supplementary scavenging pump so as to deliver two charges of scavenging mixture having a phase difference of 180° therebetween so that these two charges of scavenging mixture are individually adapted to the two power cylinder-piston assemblies which operate in synchronization with a phase difference of 180° therebetween, it is desirable that the supplementary scavenging pump should be constructed as a double acting pump cylinder-piston assembly 400 having two horizontally opposed pistons. The pump assembly 400 has a pump cylinder 402 supported by the cylinder block 10 and surrounded by a cooling jacket 406 defined by a jacket wall 404. In the pump cylinder 402 are opposedly provided a pair of disk-like pump pistons 408 and 410 which are individually connected with push rods 412 and 414 which individually extend through openings 420 and 422 formed in endplates 416 and 418 which close opposite ends of the pump cylinder 402. The openings 420 and 422 are individually constructed as bearing openings which slidably and sealingly receive the push rods 412 and 414, respectively. By this arrangement the inside of the pump cylinder 402 is divided into three pump chambers 424, 426, and 428. The other ends of the push rods 412 and 422 are, as better shown in FIG. 19, individually connected with 0-members 430 and 432. As shown in FIG. 19 with respect to the connection between the push rod 412 and the O-member 430, the end of the push rod 412 is formed with a threaded portion 436 which is screwed into a correspondingly threaded opening 434 formed in the O-member 430, and the screw engagement is fixed by a pin 438. The O-members 430 and 432 individually have grooves 440 and 442 in which are individually engaged crankpins 444 and 446 which are individually supported by crank arms 448 and 450, each being constructed as a pair of crank arms. The crankcases 452 and 454 housing individually the crank mechanisms constructed by the aforementioned crank arms, etc., are connected with the inside of an air cleaner not shown in the figure by way of a positive crankcase ventilation valve also not shown in the figure, so as to control pressure fluctuation in the crankcases.

The outlet of the carburetor 40 is connected with the ports 144 and 244 of the first and second power cylinder-piston assemblies 100 and 200 by a common passage 50 and two branch passages 50a and 50b, respectively, is connected with the ports 146 and 246 of the first and second power cylinder-piston assemblies 100 and 200 by a common passage 52 and two branch passages 52a and 52b, respectively, and is connected with ports 456, 458, and 460, which open to the pump chambers 424, 426, and 428, by way of passages 60, 62, and 64, respectively. In the passages 60, 62, and 64 are provided, as respectively located close to the ports 456, 458, and 460, reed valves 66, 68, and 70. The pump chamber 424 is connected with the crankcase 124 of the first power cylinder-piston assembly 100 by way of a first delivery port 462 and a passage 72 and is also connected with the scavenging ports 128C of the first power cylinder-piston assembly 100 by way of a second delivery port 463 and a passage 73. On the other hand, the pump chambers 426 and 428 are connected with the crankcase 224 of the second power cylinder-piston assembly 200 by way of their first delivery ports 446 and 468 and passages 74 and 76, respectively, and further by a common passage 72 to which the passages 74 and 76 join, and are also connected with the scavenging ports 228C of the second power cylinder-piston assembly 200 by way of their second delivery ports 467 and 469 and passages 75 and 77, respectively, and further by a common passage 81 to which the passages 75 and 77 join. Inlet ports 456, 458, and 460 of the pump 400 and its second delivery ports 463, 467, and 469 are individually so positioned that they positively open individually to the corresponding pump chambers without interfering with the pistons 408 and 410 even when these pistons have come to their BDC or to their TDC with respect to the pump chambers 424, 426, or 428. By contrast, the first delivery port 462 of the pump chamber 424 is so positioned as to be closed by the pump piston 408 at a selected phase point located in a phase range which is 10°-30° in advance of its bottom dead center with regard to the pump chamber 424. Similarly, the first delivery ports 466 and 468 of the pump chambers 426 and 428 are individually so positioned as to be closed by the pump pistons 408 and 410, respectively, at a selected phase point located in a phase range which is 10°-30° in advance of its bottom dead center with respect to the pump chambers 426 and 428.

The section along line VIII—VIII in FIG. 18 shows a structure similar to that shown in FIG. 8.

The ratio of the pumping stroke volume of the pumping chamber 424 to the stroke volume of the power cylinder-piston assembly 100 and the ratio of the sum of the pumping stroke volume of the pumping chambers 426 and 428 to the stroke volume of the power cylinder-piston assembly 200 should be individually determined in the same manner as in the preceding embodiments so as to be in the range of 0.35-0.85, whereby the engine of this embodiment of the present invention can also exhibit high engine performance and can satisfy requirements with regard to the standard for exhaust gas purification in a desirable manner.

Also in this fifth embodiment the operational phases of the individual pumping chambers of the pump 400 should be determined relative to the operational phases of the first and second power assemblies 100 and 200, respectively, in the same manner as explained with reference to the preceding embodiments, so that the bottom dead center of each pumping chamber is, as viewed in the crank angle diagram, positioned in a range between 15° in advance of and 15° behind the phase point which is 90° in advance of the scavenging port opening phase point So of the power cylinder-piston assembly to which the pumping chamber supplies scavenging mixture.

Although it is desirable that the clearance volume of the pumping chambers 426 and 428 should be as small as possible, if it is so designed, the push rods 412 and 414 will be supported only like a cantilever when the pistons 408 and 410 are at their BDC with respect to the pumping chamber 424, and the structural stability and durability of the push rods and the related mechanisms will be low. Such a problem can be obviated if, for example, the end plates 416 and 418 are thickened or formed like boxes so as to reduce the clearance volume of the pumping chambers 426 and 428. The clearance volume of the pumping chamber 424 can be reduced easier than the clearance volumes of the pumping chambers 426 and 428. By taking this matter into consideration, in the embodiment shown in FIG. 18 the pumping chambers 426 and 428 are connected with the power cylinder-piston assembly 200 by way of relatively short passages, while on the other hand the pumping chamber 424 is connected with the pump cylinder-piston assembly 100 by way of relatively long passages so that the clearance volumes related to the two pumping chambers are well balanced.

In the pump assembly 400 the reciprocating inertia force is relatively larger than its rotary inertia force. However, the reciprocating inertia force is internally cancelled and does not give any external effect.

FIG. 20 is a view similar to FIG. 3, showing a sixth embodiment of the present invention. In this embodiment the pump 300 is constructed as a single piston reciprocating type pump cylinder-piston assembly. As apparent from FIG. 20, the engine therein shown has the structure in which the right half portion of the pump assembly 300 in the first embodiment shown in FIG. 3, i.e., substantially the half consisting of the pump cylinder 302, piston 310, connecting rod 314, crank pin 318 and crank arm 322, has been deleted. In FIG. 20, the portions corresponding to those shown in FIG. 3 are designated by the same reference numerals, and these corresponding portions operate in the same manner in both embodiments. When such a single piston pump assembly is employed, there are disadvantages with regard to the dimensions of the pump piston relative to the power piston and with regard to dynamic balance of the pump assembly when compared with a pump assembly of the horizontally opposed piston type, as explained hereinabove. However, in this case the manufacturing cost is reduced, and when the engine is small-sized, the balance and dimensional disadvantages can be sufficiently compensated for by the cost advantage. A balancer such as an eccentric mass 329 mounted to the crankshaft 14 is, albeit insufficient, effective for compensating for the unbalanced reciprocating mass of the pump 300, although such a balancer is not essential.

Since the structure and operation of other portions of the embodiment showh in FIG. 20 are substantially the same as those of the embodiment shown in FIG. 3, detailed descriptions of those will be omitted in order to avoid duplication.

Although the invention has been shown and described with respect to some preferred embodiments thereof, it should be understood by those skilled in the art that various changes and omissions of the form and the detail thereof may be made therein without departing from the scope of the invention.

We claim:
1. A two-stroke gasoline engine comprising: at least one two-stroke power cylinder-piston assembly including a power cylinder, two horizontally imposed power pistons, two crankcases to perform crankcase compression, main scavenging ports and exhaust ports being so arranged in said power cylinder so as to perform uniflow scavenging and so that said exhaust ports are opened before said scavenging ports and said exhaust ports are closed after said scavenging ports have been closed, said main scavenging ports being supplied with scavenging mixture from said crankcases, and at least one additional scavenging port located in an area including one of said main scavenging ports and arranged to eject a flow of scavenging mixture in substantially a radial direction transverse the axis of said uniflow scavenging so as to create turbulence of scavenging mixture; a supplementary scavenging pump including at least one pump cylinder-piston assembly of the reciprocating type having at least one pumping chamber and at least one pumping piston for supplying scavenging mixture during compression strokes of said pumping piston, said pump cylinder-piston assembly in synchronization therewith; a first passage for conducting scavenging mixture from one pumping chamber of one pump cylinder-piston assembly of said supplementary scavenging pump to at least one crankcase of one power cylinder-piston assembly for supplying scavenging mixture from said one pumping chamber to the main scavenging ports of said one power cylinder-piston assembly via said one crankcase; a second passage for conducting scavenging mixture from said one pumping chamber to the additional scavenging port of said one power cylinder-piston assembly, the top dead center of said one pumping chamber being, as viewed according to crank angle, substantially shifted from the bottom dead center toward the main scavenging ports closing phase point of said one power cylinder-piston assembly; and means for closing said first passage over a substantial range as viewed according to crank angle from one phase point located between the main scavenging port opening phase point and the bottom dead center of said one power cylinder-piston assembly to at least the top dead center of said one pumping chamber and for concentrating the remaining scavenging mixture from said supplementary pump in said second passage to said additional scavenging port; wherein said main scavenging ports include first and second groups of scavenging ports, and wherein said first passage supplies scavenging mixture from said one pumping chamber to only one of the two crankcases of said one power cylinder-piston assembly, said one crankcase supplying scavenging mixture only to said first group of scavenging ports of said one power cylinder-piston assembly, while the other of the two crankcases of said one power cylinder-piston assembly supplies scavenging mixture only to said second group of scavenging ports of said one power cylinder-piston assembly.

2. The engine of claim 1, wherein said supplementary scavenging pump has total stroke volume of 0.35–0.85 times as large as the total stroke volume of said power cylinder-piston assembly, wherein the bottom dead center of said one pumping chamber is, as viewed according to crank angle, in a range between 15° in advance of and 15° behind the point which is 90° in advance of the main scavenging port opening phase point of said one power cylinder-piston assembly, and wherein said one phase point is, as viewed according to crank angle, in a range between 10°–30° in advance of the bottom dead center of said one power cylinder-piston assembly.

3. The engine of claims 1 or 2, wherein said first group of scavenging ports are shifted relative to said second group of scavenging ports so that the former are opened in advance of the latter.

4. The engine of claim 1 or 2, wherein said closer includes a delivery port which opens in the wall of the cylinder of said one pump cylinder-piston assembly and is connected with said first passage, and a pump piston which slides in said cylinder so as to close said delivery port.

5. The engine of claim 1 or 2, wherein said closer includes an inlet port which opens in the wall of the crankcase of said one power cylinder-piston assembly and is connected with said first passage, and a crank arm which rotates in the crankcase and has a valve element which selectively closes said inlet port in accordance with the rotation of the crank arm.

6. The engine of claim 1 or claim 2, wherein said pump cylinder-piston assembly has two horizontally opposed pistons.

7. The engine of claim 1 or claim 2, wherein said pump cylinder-piston assembly has a single piston.

8. The engine of claim 1 or claim 2, wherein said second passage is so throttled as to effect so high speed ejection of scavenging mixture from said additional scavenging port that turbulent flows may be produced in a power cylinder of said power cylinder-piston assembly.

9. The engine of claim 1 or 2, wherein said additional scavenging port is shifted relative to said main scavenging ports so that the former is opened later than the latter.

10. The engine of claim 9, wherein said additional scavenging port is so positioned that its closing phase point is approximately 15° behind the top dead center of said one pumping chamber.

* * * * *